United States Patent
Okamoto et al.

(10) Patent No.: US 11,403,041 B2
(45) Date of Patent: Aug. 2, 2022

(54) MEMORY SYSTEM AND CONTROL METHOD THEREOF

(71) Applicant: Kioxia Corporation, Tokyo (JP)

(72) Inventors: Atsushi Okamoto, Yokohama (JP); Hiroyuki Yamaguchi, Kawasaki (JP); Ryoichi Kato, Yokohama (JP); Hiroki Matsudaira, Funabashi (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/201,341

(22) Filed: Mar. 15, 2021

(65) Prior Publication Data
US 2022/0091786 A1    Mar. 24, 2022

(30) Foreign Application Priority Data
Sep. 23, 2020 (JP) ............... JP2020-158268

(51) Int. Cl.
*G06F 3/06* (2006.01)
*G06F 12/0882* (2016.01)
*G06F 12/02* (2006.01)
*G06F 12/0891* (2016.01)

(52) U.S. Cl.
CPC .......... *G06F 3/0659* (2013.01); *G06F 3/0619* (2013.01); *G06F 3/0679* (2013.01); *G06F 12/0246* (2013.01); *G06F 12/0882* (2013.01); *G06F 12/0891* (2013.01)

(58) Field of Classification Search
None
See application file for complete search history.

(56) References Cited

U.S. PATENT DOCUMENTS

| | | | |
|---|---|---|---|
| 10,802,917 B2 | 10/2020 | Nishikubo et al. | |
| 2011/0173380 A1 | 7/2011 | Yano et al. | |
| 2012/0159244 A1* | 6/2012 | Hirao | G06F 11/1441 |
| | | | 714/E11.119 |
| 2012/0216098 A1 | 8/2012 | Moro | |
| 2018/0196614 A1 | 7/2018 | Ivanov | |
| 2019/0066801 A1 | 2/2019 | Battaje et al. | |

FOREIGN PATENT DOCUMENTS

| | | | |
|---|---|---|---|
| JP | 2010-157139 | 7/2010 | |
| JP | 2012-173933 | 9/2012 | |
| JP | 2015-191395 | 11/2015 | |
| JP | 2019-185350 | 10/2019 | |
| WO | WO-2010074353 A1 * | 7/2010 | .......... G06F 11/1441 |

* cited by examiner

*Primary Examiner* — Kevin Verbrugge
(74) *Attorney, Agent, or Firm* — Oblon, McClelland, Maier & Neustadt, L.L.P.

(57) ABSTRACT

A memory system according to an embodiment includes a nonvolatile memory and a memory controller. The nonvolatile memory includes a first storage region and a second storage region. The memory controller comprises a third storage region storing a master table and a fourth storage region storing a change history of the master table. The memory controller is configured to: order the nonvolatile memory to write the master table stored in the third storage region in the first storage region when receiving a power-off command from outside; order the nonvolatile memory to write the change history stored in the fourth storage region in the second storage region.

10 Claims, 18 Drawing Sheets

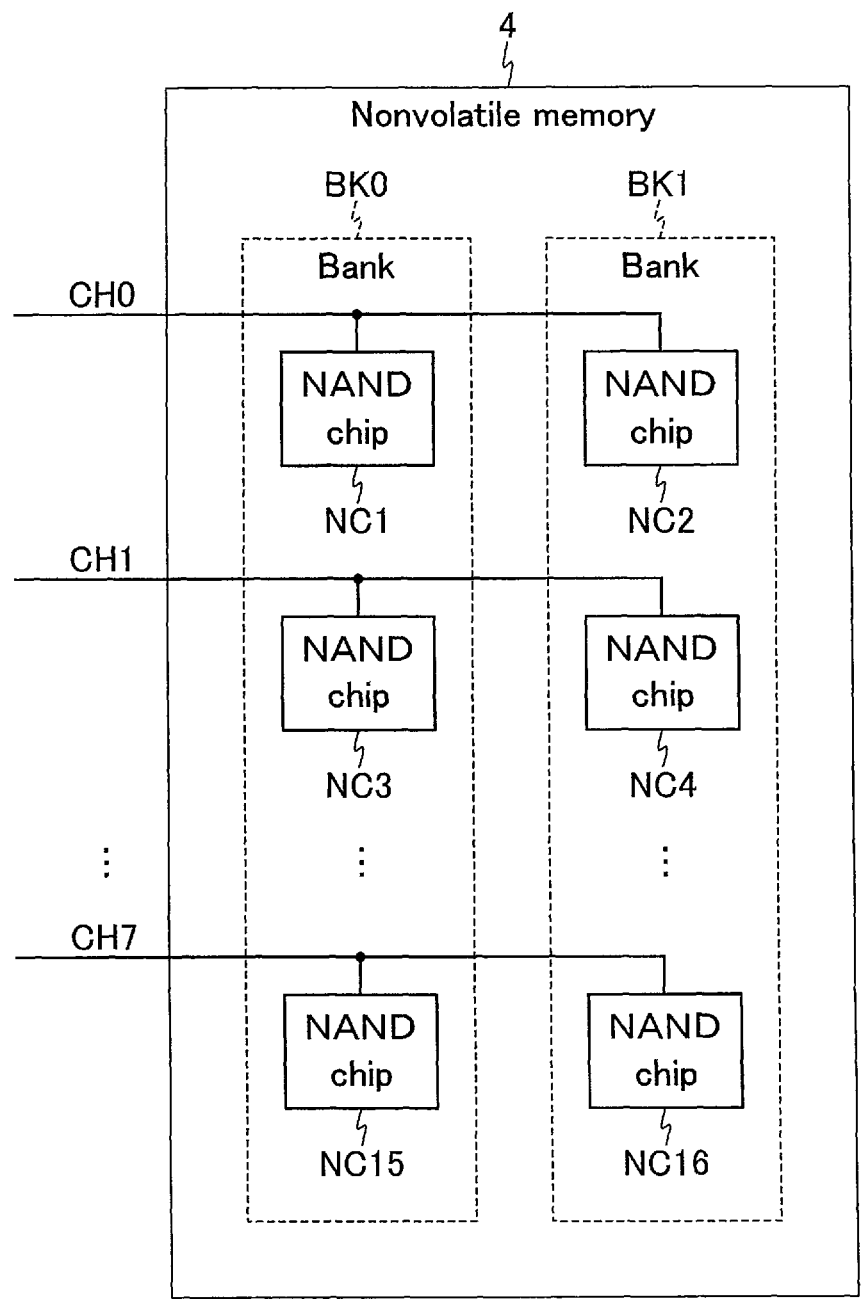
F I G. 3

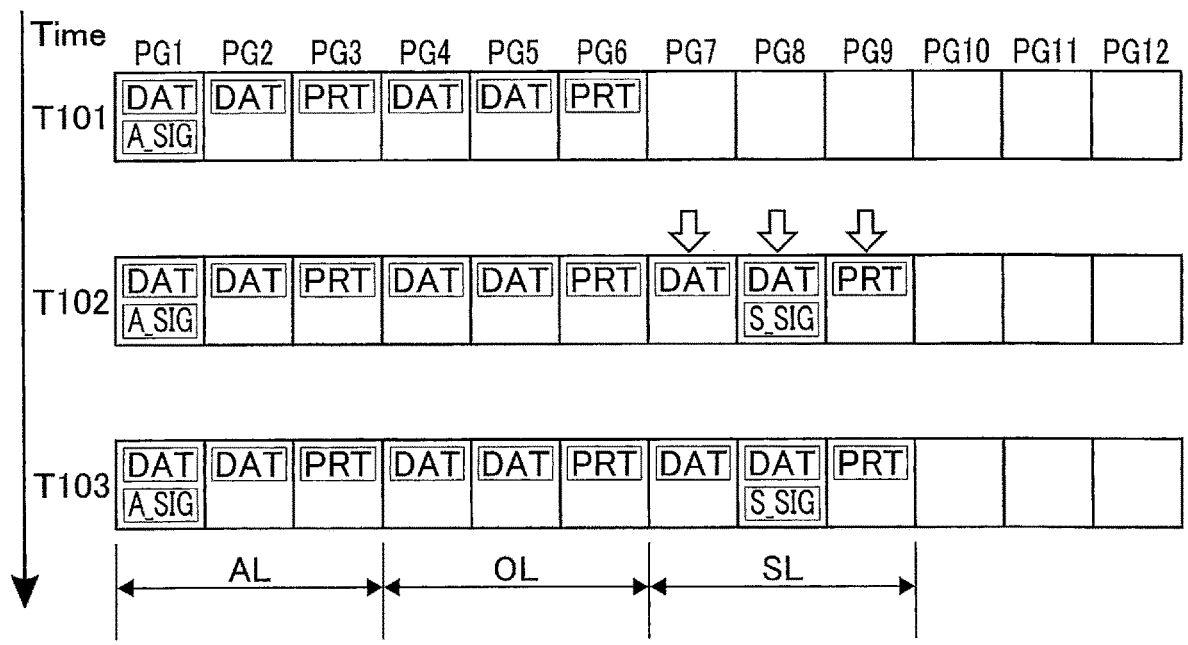
F I G. 12

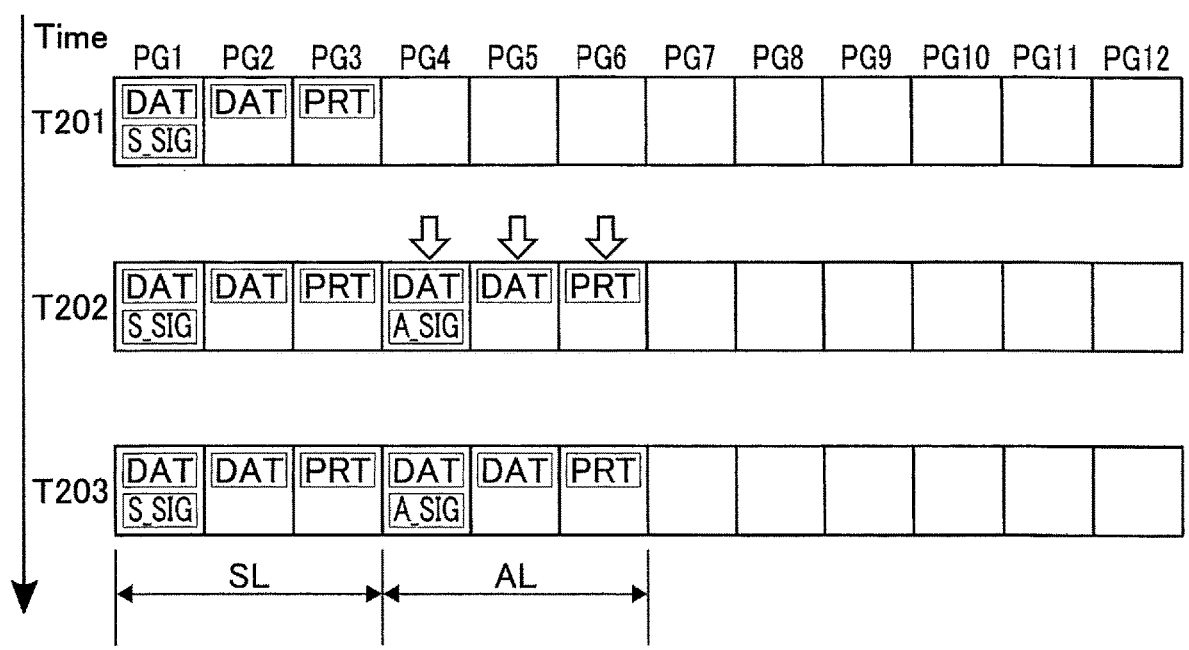
F I G. 16

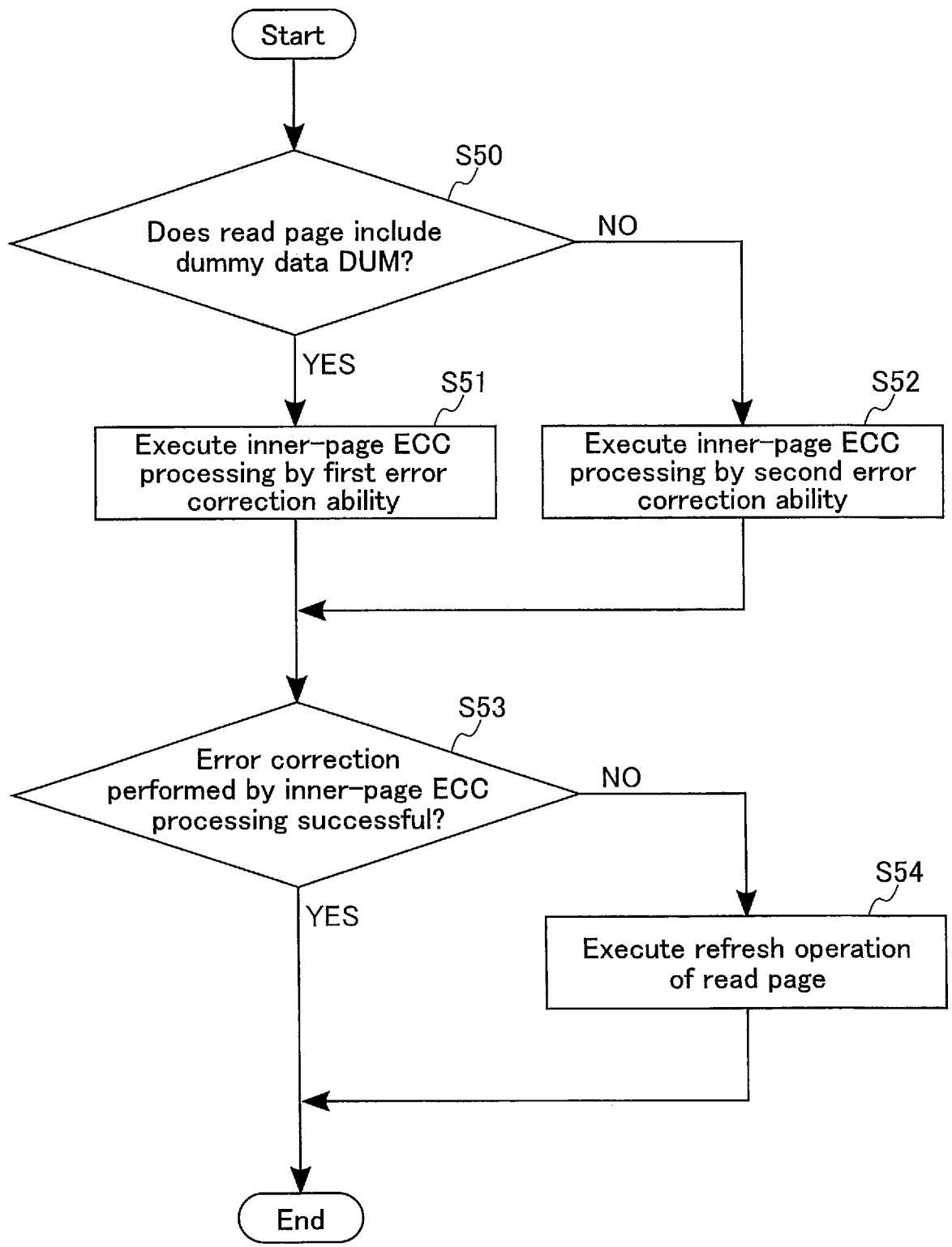
F I G. 19

MEMORY SYSTEM AND CONTROL METHOD THEREOF

CROSS-REFERENCE TO RELATED APPLICATIONS

This application is based upon and claims the benefit of priority from Japanese Patent Application No. 2020-158268, filed Sep. 23, 2020, the entire contents of which are incorporated herein by reference.

FIELD

Embodiments described herein relate generally to a memory system and a control method thereof.

BACKGROUND

A NAND flash memory, capable of storing data in a nonvolatile manner, is known.

BRIEF DESCRIPTION OF THE DRAWINGS

FIG. 3 is a block diagram showing a configuration example of a nonvolatile memory according to the first embodiment.

FIG. 12 is a block diagram showing an example of data stored by a write operation of a standby log in the log recording operation of the memory system according to the first embodiment.

FIG. 16 is a block diagram showing an example of data stored by second and subsequent write operations of the active log in the memory system according to the second embodiment.

FIG. 19 is a flowchart showing an example of an error correction method of data stored in a NAND log region of a memory system according to a third embodiment.

DETAILED DESCRIPTION

A memory system according to an embodiment includes a nonvolatile memory and a memory controller. The nonvolatile memory includes a first storage region and a second storage region. The memory controller is configured to control the nonvolatile memory. The memory controller comprises a third storage region storing a master table and a fourth storage region storing a change history of the master table. The memory controller is configured to: order the nonvolatile memory to write the master table stored in the third storage region in the first storage region when receiving a power-off command from outside; order the nonvolatile memory to write the change history stored in the fourth storage region in the second storage region; generate a first standby log including first system data relating to power-off and a first standby signature indicating that recording of the change history has ended; order the nonvolatile memory to write the first system data of the first standby log in the second storage region; and order the nonvolatile memory to write the first standby signature of the first standby log in the second storage region after the first system data is written in the second storage region.

Hereinafter, embodiments will be explained with reference to the accompanying drawings. Each embodiment is an example of a device or a method that embodies a technical idea of the invention. The drawings are schematic or conceptual. The dimensions and scale, etc. of each drawing are not necessarily the same as those of the actual products. The technical idea of the present invention is not specified by the shape, structure, arrangement, etc. of the constituent elements. In the following descriptions, constituent elements having substantially the same function and configuration will be assigned the same symbols. A numeral following letters constituting a reference symbol is referred to by reference symbols including the same letters. Furthermore, a numeral following letters constituting a reference symbol is used to distinguish elements having the same configuration. In a case where elements represented by reference symbols including the same letters need not be distinguished from one another, those elements will be referred to by reference symbols including only the letters.

[1] First Embodiment

A first embodiment will be described below.

[1-1] Configuration of First Embodiment

[1-1-1] Configuration of Memory System 1

Figure 1:
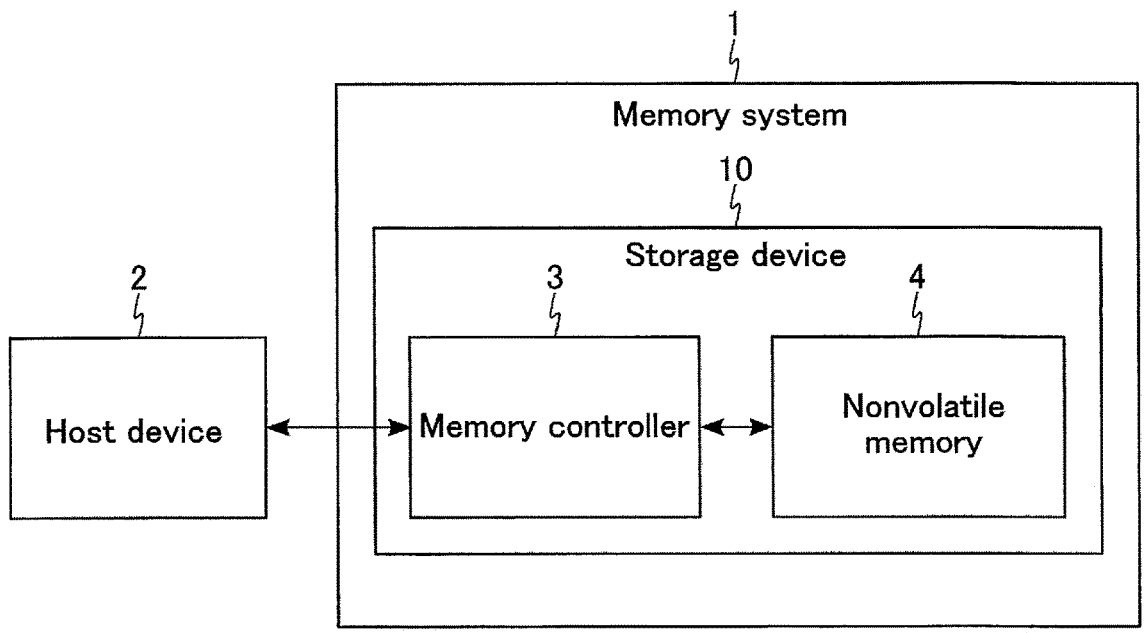
FIG. 1 is a block diagram showing a configuration example of an information processing system according to a first embodiment.

FIG. 1 is a block diagram showing a configuration example of an information processing system according to a first embodiment. The information processing system according to the first embodiment includes a host device 2 and a memory system 1. The host device 2 is, for example, a personal computer, a portable information terminal, or a server. The memory system 1 reads or writes data, etc. based on a command received from the host device 2.

The memory system 1 according to the present embodiment includes a storage device 10. The storage device 10 includes a memory controller 3 and a nonvolatile memory 4. The memory controller 3 controls the nonvolatile memory 4. The nonvolatile memory 4 stores data in a nonvolatile manner.

[1-1-2] Configuration of Memory Controller 3

Figure 2:
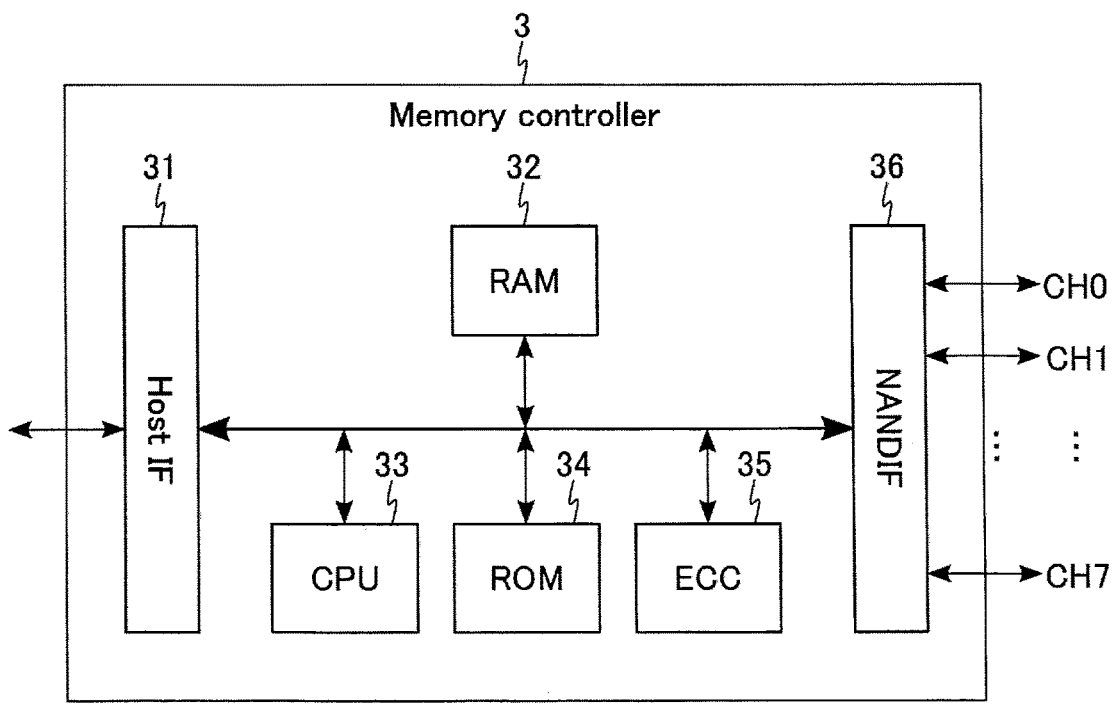
FIG. 2 is a block diagram showing a configuration example of a memory controller according to the first embodiment.

FIG. 2 is a block diagram showing a configuration example of a memory controller according to the first embodiment. The memory controller 3 includes a host interface (host IF) 31, a random access memory (RAM) 32, a central processing unit (CPU) 33, a read only memory (ROM) 34, an error checking and correcting (ECC) circuit 35, and a NAND interface (NANDIF) 36.

The host IF 31 is a hardware interface connected to a host device 2 which is an information processing apparatus outside the memory system 1. The host IF 31 communicates with the host device 2. The host IF 31 may support a communication interface standard, such as a serial advanced technology attachment (SATA), a serial attached SCSI (SAS), and a PCI express (PCIe) (registered trademark).

The RAM 32 is a volatile memory. The RAM 32 is, for example, a dynamic random access memory (DRAM) or a static random access memory (SRAM). The RAM 32 is used as a working area of the CPU 33. The RAM 32 stores, for example, firmware or management tables.

The CPU 33 is a processor. The CPU 33 controls the operation of the entire memory controller 3.

The ROM 34 is a nonvolatile memory. The ROM 34 is, for example, an electrically erasable programmable read-only memory (EEPROM™) (registered trademark). The ROM 34 stores, for example, programs of, such as, firmware.

The ECC circuit 35 is a circuit for executing error checking and correcting (ECC) processing. In a write operation, the ECC circuit 35 generates parity based on received write data, and adds the generated parity to the write data. In a read operation, the ECC circuit 35 generates a syndrome based on received read data, and detects and corrects errors in the read data based on the generated syndrome. The ECC circuit 35 is capable of executing an inner-page ECC operation for executing error correction processing of data in a page PA, and an inter-page ECC operation for executing error correction processing of data among a plurality of pages PA. In the inner-page ECC operation, the ECC circuit 35 generates parity for each page PA, and stores a pair of data and parity for each page. In the inter-page ECC operation, the ECC circuit 35 generates parity using a plurality of pages PA, and stores the parity on a next page PA of the plurality of pages PA.

The NANDIF 36 is a hardware interface connected to the nonvolatile memory 4. The NANDIF 36 supports a NAND interface standard. The NANDIF 36 includes eight channels CH0 to CH7. Each of the plurality of channels is able to operate in parallel.

[1-1-3] Configuration of Nonvolatile Memory 4

FIG. 3 is a block diagram showing a configuration example of a nonvolatile memory according to the first embodiment. The nonvolatile memory 4 is, for example, a NAND-type flash memory. The nonvolatile memory 4 is connected to the NANDIF 36 of the memory controller 3. The nonvolatile memory 4 includes a plurality of NAND chips NC1 to NC16.

Two chips among the plurality of NAND chips NC are connected to one channel. Specifically, NAND chips NC1 and NC2 are connected to channel CH0. NAND chips NC3 and NC4 are connected to channel CH1. NAND chips NC5 and NC6 are connected to channel CH2. NAND chips NC7 and NC8 are connected to channel CH3. NAND chips NC9 and NC10 are connected to channel CH4. NAND chips NC11 and NC12 are connected to channel CH5. NAND chips NC13 and NC14 are connected to channel CH6. NAND chips NC15 and NC16 are connected to channel CH7.

The two NAND chips NC connected to one channel are distinguished as a chip belonging to bank BK0 and a chip belonging to bank BK1. Specifically, NAND chips NC1, NC3, NC5, NC7, NC9, NC11, NC13, and NC15 belong to bank BK0. NAND chips NC2, NC4, NC6, NC8, NC10, NC12, NC14, and NC16 belong to bank BK1.

The two NAND chips NC connected to one channel share some of the signal wiring. The two NAND chips NC connected to one channel are capable of operating in parallel by, for example, a bank interleave operation.

[1-1-4] Configuration of NAND Chip NC

Figure 4:
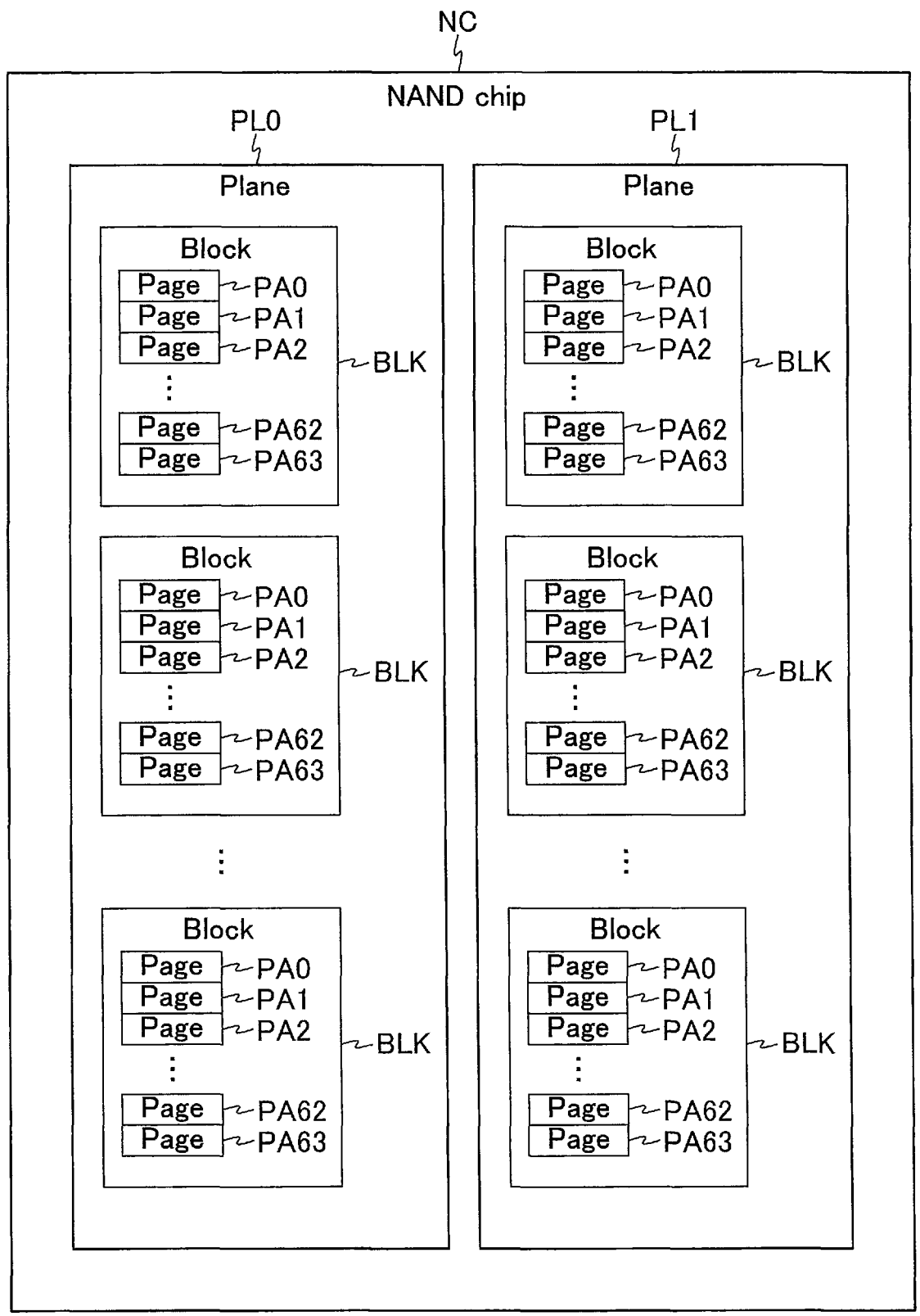
FIG. 4 is a block diagram showing a configuration example of a NAND chip according to the first embodiment.

FIG. 4 is a block diagram showing a configuration example of the NAND chip NC according to the first embodiment. The NAND chip NC includes plane PL0 and plane PL1. Plane PL0 and plane PL1 are able to operate in parallel. Plane PL0 and plane PL1 each include a plurality of blocks BLK. The block BLK is a minimal unit by which data can be erased in the NAND chip NC. The block BLK includes a plurality of pages, e.g., page PA0 to page PA63. The page PA is a unit by which data can be written or read in the NAND chip NC. The page PA includes a plurality of memory cells. The nonvolatile memory 4 stores data in accordance with, for example, a threshold voltage of a memory cell.

[1-1-5] Configuration of Logical Block LBLK

Figure 5:
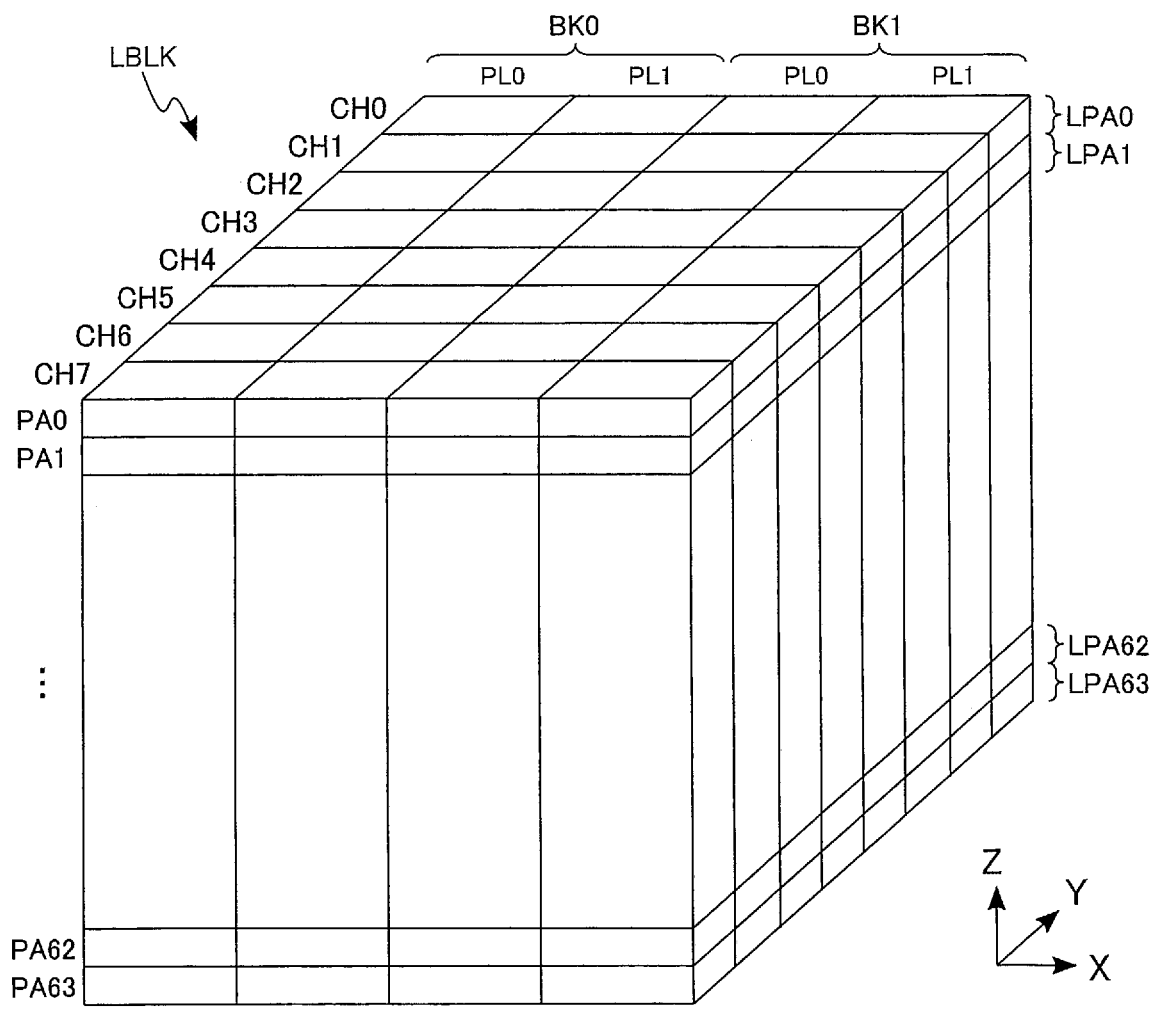
FIG. 5 is a conceptual diagram showing a configuration example of a logical block in a memory system according to the first embodiment.

FIG. 5 is a conceptual diagram showing a configuration example of a logical block LBLK in the memory system according to the first embodiment. In FIG. 5, a logical block LBLK is schematically expressed by a three-dimensional space formed along an X-axis, a Y-axis, and a Z-axis intersecting each other. In FIG. 5, the X-axis corresponds to banks BK0 and BK1 of plane PL0 and banks BK0 and BK1 of plane PL1. The Y-axis corresponds to channel CH0 to channel CH7. The Z-axis corresponds to page PA0 to page PA63.

One logical block LBLK includes two banks BK0 and BK1. One bank BK includes two planes PL0 and PL1. One plane PL include a plurality of blocks BLK. One block BLK includes a plurality of pages PA0 to page PA63. Each set of a plurality of pages PA0 to PA63 is referred to as logical pages LPA0 to LPA63. One logical page LPA includes, for example, 32 pages PA. The 32 pages PA included in the logical page LPA may be written or read at the same time. The number of channels, the number of banks, and the number of planes, etc. may be changed as appropriate. The number of blocks included in the logical block LBLK and the number of pages included in the logical page LPA may be changed as appropriate.

[1-1-6] Configuration of Storage Region of RAM 32

Figure 6:
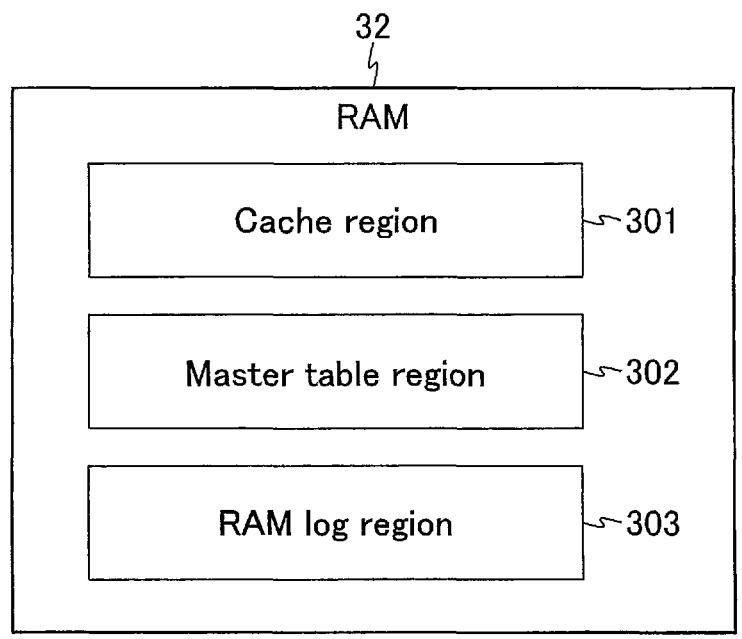
FIG. 6 is a block diagram showing an example of a storage region of a RAM according to the first embodiment.

FIG. 6 is a block diagram showing an example of a storage region of the RAM 32 according to the first embodiment. The RAM 32 includes a cache region 301, a master table region 302, and a RAM log region 303.

The cache region 301 is a region for temporarily storing data received from outside or data read from the nonvolatile memory 4. The master table region 302 is a region for storing a master table. The master table is a table including information used to manage a storage region of the nonvolatile memory 4. The master table includes various management tables, such as a logical-physical translation table or a table for managing unused blocks. The RAM log region 303 is a region for storing a difference log. The difference log includes a change history of the master table.

[1-1-7] Configuration of Storage Region of Nonvolatile Memory 4

Figure 7:
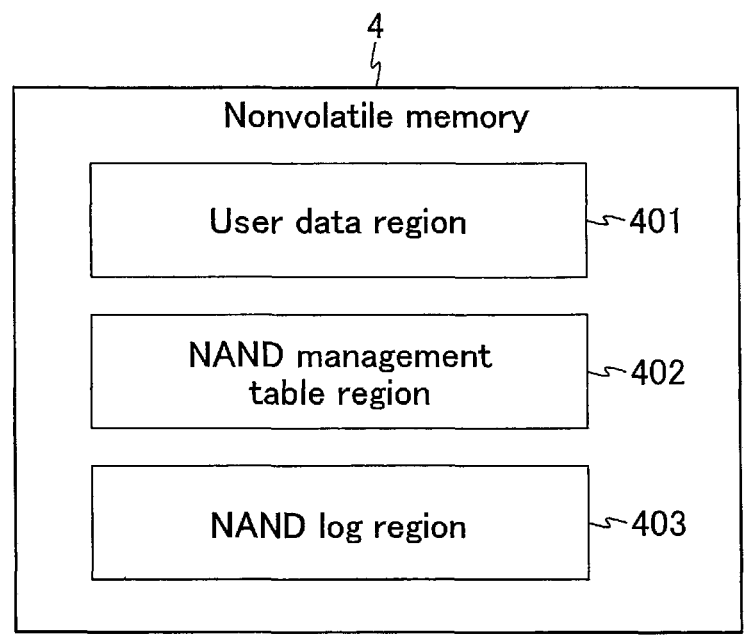
FIG. 7 is a block diagram showing an example of a storage region of the nonvolatile memory according to the first embodiment.

FIG. 7 is a block diagram showing an example of a storage region of the nonvolatile memory 4 according to the first embodiment. The nonvolatile memory 4 includes a user data region 401, a NAND management table region 402, and a NAND log region 403.

The user data region 401 is a region for storing user data. The user data is, for example, data the memory system 1 receives from the host device 2. The NAND management table region 402 and the NAND log region 403 are regions storing system data, etc. The system data is a copy of the master table or data relating to the master table. The NAND management table region 402 stores the copy of the master table. The NAND log region 403 stores a difference log.

Figure 8:
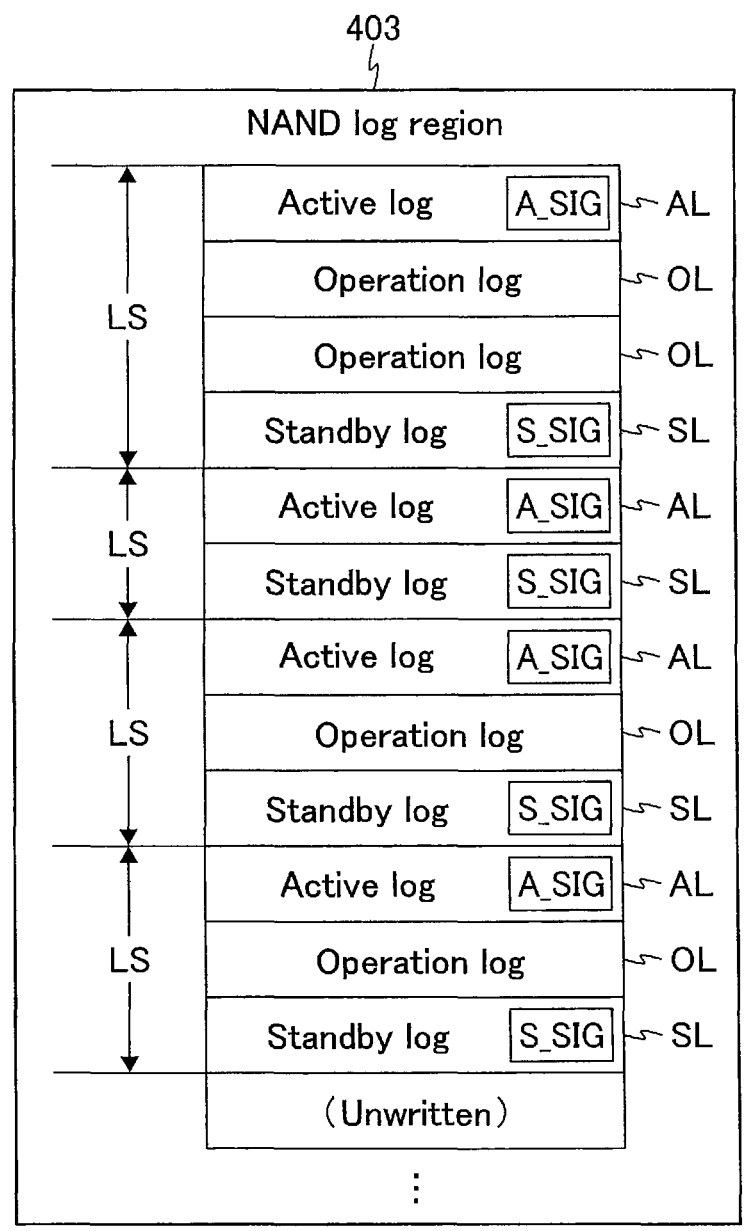
FIG. 8 is a block diagram showing an example of system data stored in a NAND log region included in the nonvolatile memory according to the first embodiment.

FIG. 8 is a block diagram showing an example of the system data stored in the NAND log region 403 included in the nonvolatile memory 4 according to the first embodiment. The NAND log region 403 stores, for example, a plurality of log sets LS.

The log set LS is data set written in the NAND log region 403. The log set LS is generated when the memory system 1 executes an operation based on a command from the host device 2. The log set LS includes, for example, an active log AL, an operation log OL, and a standby log SL. The active log AL is arranged at the top of the log set LS. The standby log SL is arranged at the end of the log set LS. The operation log OL is arranged between the active log AL and the standby log SL in the log set LS.

The active log AL includes an active signature A_SIG and various kinds of system data relating to writing of the active log AL. The system data of the active log AL may include a difference log. The active signature A_SIG is an identifier indicating that the memory system 1 has started recording the difference log. For example, the active signature A_SIG is stored on the top page PA of a plurality of pages PA in which the active log AL is stored.

The operation log OL includes a difference log. The number of operation logs OL included in the log set LS may change according to the number of operations and kinds of operation executed after the memory system 1 has started recording the difference log. In a case where an operation accompanying the generation of the difference log has not been executed after starting the recording of the difference log, the log set LS does not include the operation log OL.

The standby log SL includes a standby signature S_SIG and various kinds of system data relating to writing of the standby log. The system data of the standby log SL may include a difference log. The standby signature S_SIG is an identifier indicating that the memory system 1 has ended recording the difference log. For example, the standby signature S_SIG is arranged on the last page PA of a plurality of pages PA in which the standby log SL is stored.

[1-2] Operation of First Embodiment

An operation of the memory system 1 according to the first embodiment will be described. It should be noted that a state in which power consumption of the memory controller 3 is low indicates a state in which power supply to some circuits in the memory controller 3 is limited.

[1-2-1] Power-on Sequence

Figure 9:
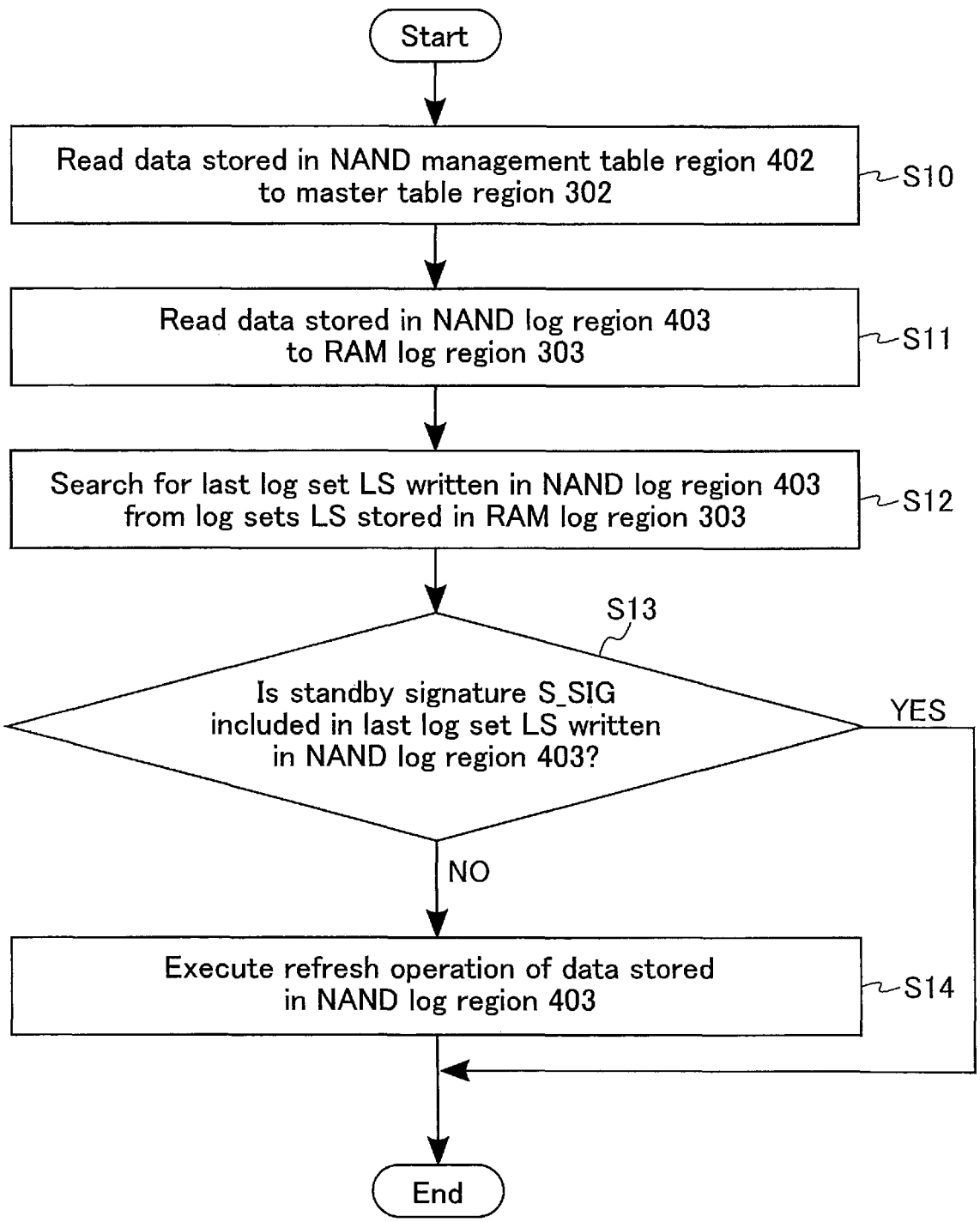
FIG. 9 is a flowchart showing an example of a power-on sequence of the memory system according to the first embodiment.

FIG. 9 is a flowchart showing an example of a power-on sequence of the memory controller 3 according to the first embodiment. The power-on sequence is a series of operations relating to activation of the memory system 1.

When receiving a power-on command from outside (Start), the memory controller 3 reads data stored in the NAND management table region 402 of the nonvolatile memory 4 and stores the read data in the master table region 302 (S10). In this manner, a copy of the master table stored in the NAND management table region 402 is stored in the master table region 302.

The memory controller 3 then reads data stored in the NAND log region 403 of the nonvolatile memory 4 and stores the read data in the RAM log region 303 (S11). In this manner, a plurality of log sets LS are stored in the RAM log region 303.

The memory controller 3 then searches for a log set LS written last in the NAND log region 403, that is, the log set LS stored in the NAND log region 403 at a latest timing, from the plurality of log sets LS stored in the RAM log region 303 (S12).

The memory controller 3 then confirms whether or not a standby signature S_SIG is included in the last log set LS written in the NAND log region 403 (S13).

In a case where the standby signature S_SIG is included in the log set LS written last (S13, YES), the memory controller 3 ends the power-on sequence (End).

In a case where the standby signature S_SIG is not included in the log set LS written last (S13, NO), the memory controller 3 executes a refresh operation of the data stored in the NAND log region 403 (S14). The refresh operation is an operation for reading data stored in a designated block BLK and writing the data read from the block BLK into other unwritten blocks BLK. An unwritten block BLK may be rephrased as a block BLK in an erase state.

When the refresh operation is completed, the memory controller 3 ends the power-on sequence (End).

[1-2-2] Log Recording Operation

Figure 10:
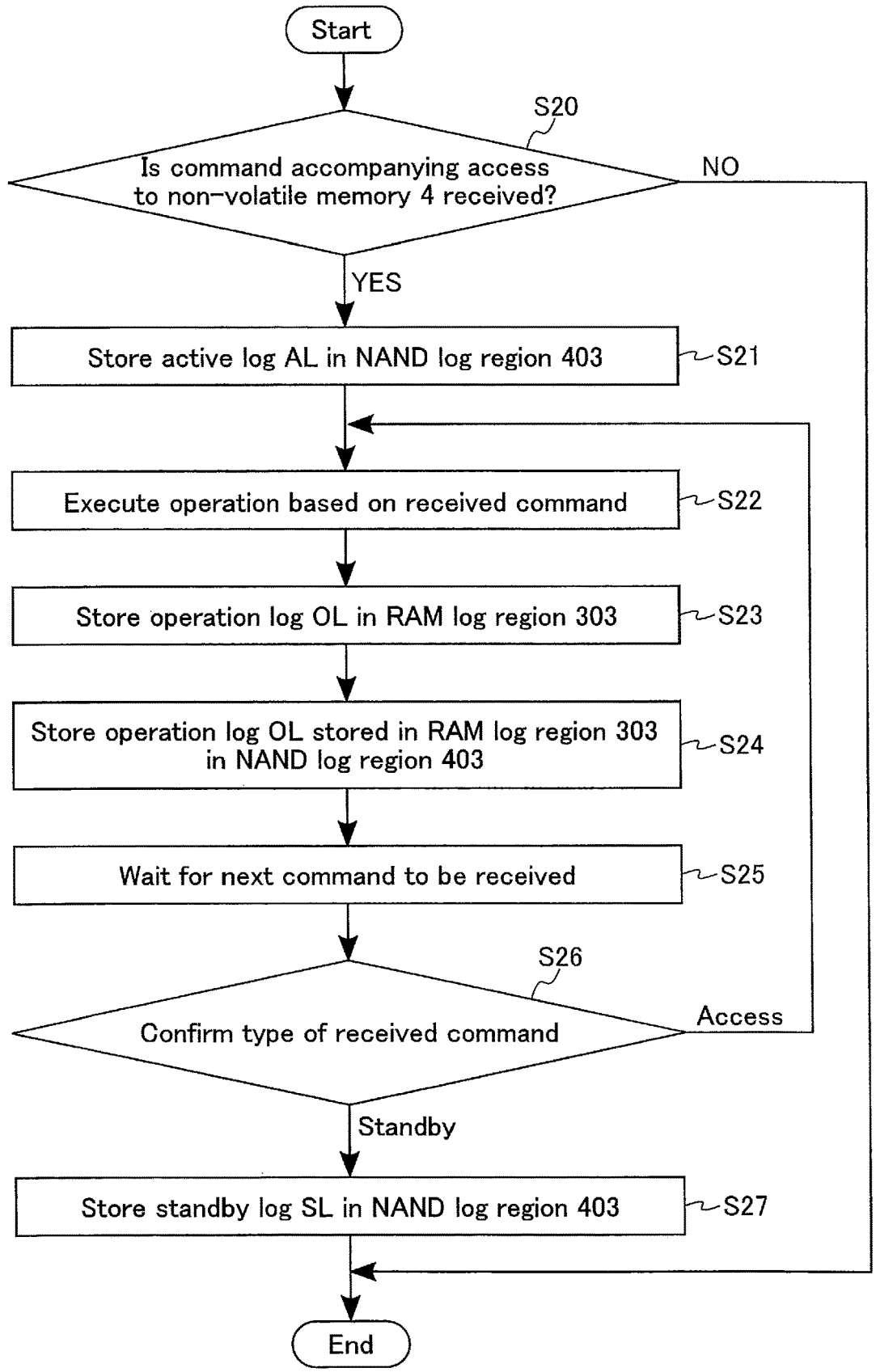
FIG. 10 is a flowchart showing an example of a log recording operation of the memory system according to the first embodiment.

FIG. 10 is a flowchart showing an example of a log recording operation of the memory system 1 according to the first embodiment. The log recording operation is an operation for generating a difference log in accordance with the operation of the memory system 1, and storing the generated difference log in the NAND log region 403.

When a command is received from outside (Start), the memory controller 3 confirms whether or not a command indicative of access to the nonvolatile memory 4 is received (S20).

In a case where a command indicative of access to the nonvolatile memory 4 is not received (S20, NO), the memory controller 3 ends a series of processing of FIG. 10 (End).

In a case where a command indicative of access to the nonvolatile memory 4 is received (S20, YES), the memory controller 3 generates an active log AL and stores the generated active log AL in the NAND log region 403 (S21).

The memory controller 3 then executes an operation based on the received command (S22).

The memory controller 3 then generates an operation log OL based on the executed operation and stores the generated operation log OL in the RAM log region 303 (S23).

The memory controller 3 then stores the operation log OL stored in the RAM log region 303 in the NAND log region 403 (S24). S22, S23, and S24 may be executed in parallel.

After S24, the memory controller 3 waits until the next command is received (S25).

The memory controller 3 then confirms the kind of the received command (S26).

In a case where the received command is a command indicative of access to the nonvolatile memory 4 (S26, Access), the memory controller 3 proceeds to processing in S22.

In a case where the received command is a standby command (S26, Standby), the memory controller 3 generates a standby log SL and stores the generated standby log SL in the NAND log region 403 (S27). The memory controller 3 subsequently ends the series of processing in FIG. 10 (End).

[1-2-3] Power-Off Sequence

Figure 11:
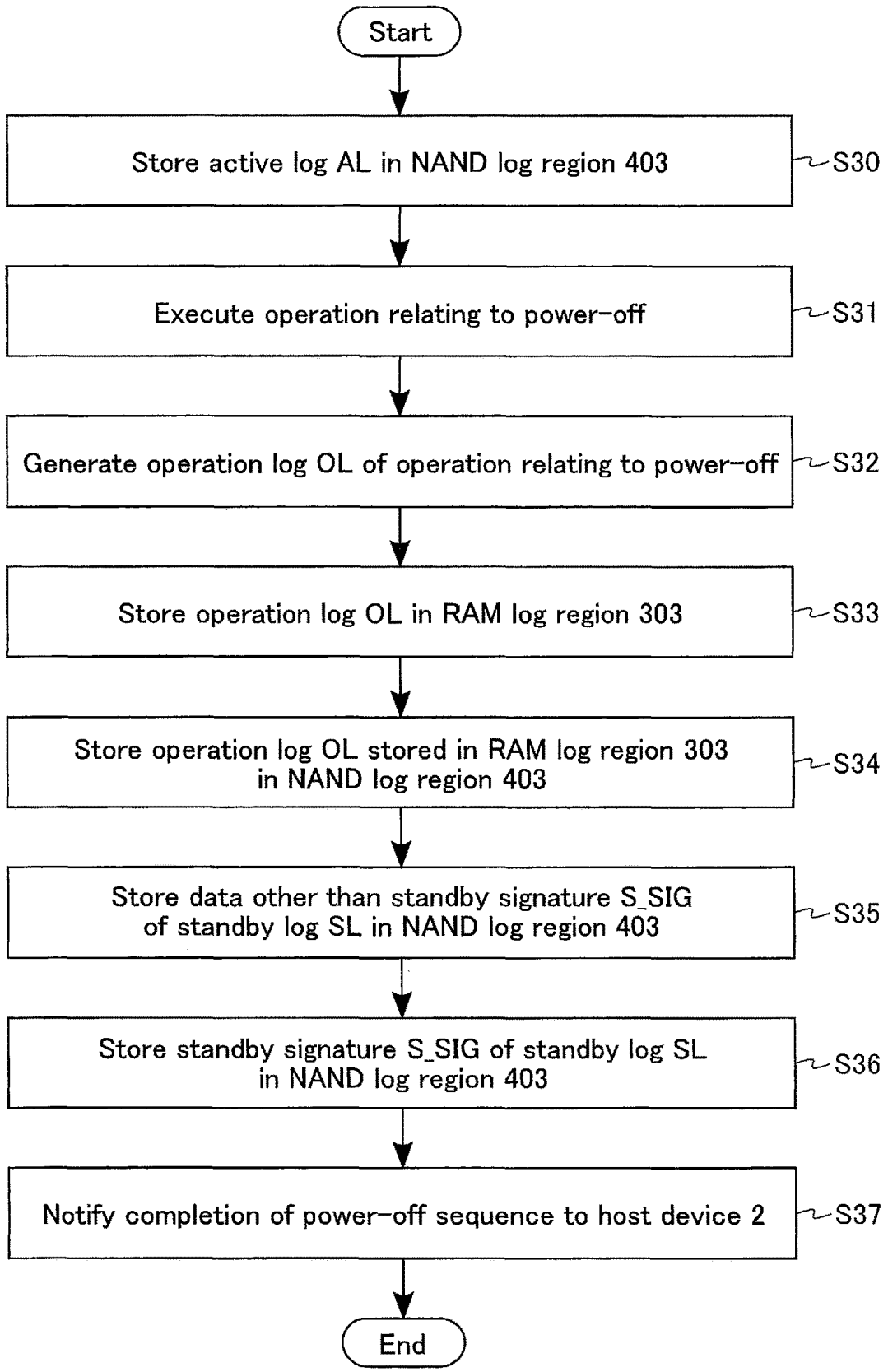
FIG. 11 is a flowchart showing an example of a power-off sequence of the memory system according to the first embodiment.

FIG. 11 is a flowchart showing an example of a power-off sequence of the memory system 1 according to the first embodiment. The power-off sequence is a series of operations relating to power-off (shut down) of the memory system 1.

When receiving a power-off command from outside (Start), the memory controller 3 generates an active log AL and stores the generated active log AL in the NAND log region 403 (S30).

The memory controller 3 then executes an operation associated with power-off (S31). The operation associated with power-off is, for example, an operation for storing the master table stored in the master table region 302 in the NAND management table region 402.

The memory controller 3 then generates an operation log OL of the operation associated with power-off (S32).

The memory controller 3 then stores the generated operation log OL in the RAM log region 303 (S33).

The memory controller 3 then stores the generated operation log OL in the NAND log region 403 (S34). The memory controller 3 may execute the processing of S31 and the processing of S32 to S34 in parallel.

The memory controller 3 then generates a standby log SL and stores data of other than a standby signature S_SIG in the generated standby log SL in the NAND log region 403 (S35).

The memory controller 3 then generates dummy data DUM and stores the generated dummy data DUM and the standby signature S_SIG in the generated standby log SL in the NAND log region 403 (S36). The dummy data DUM is invalid data. The dummy data DUM is stored in the same page PG as the standby signature S_SIG.

The memory controller 3 then notifies the host device 2 that the power-off sequence has been completed (S37). The memory controller 3 subsequently ends the series of processing in FIG. 11 (End).

[1-2-4] Write Operation of Standby Log SL

Specific examples of each of the write operation of the standby log SL in the log recording operation and the write operation of the standby log SL in the power-off sequence will be described.

(Write Operation of Standby Log SL in Log Recording Operation)

FIG. 12 is a block diagram showing an example of data stored by a write operation of the standby log SL in the log recording operation of the memory system 1 according to the first embodiment. Each of T101 to T103 aligned along a time axis indicates a certain time. A plurality of blocks aligned to the right of each time indicate a plurality of pages of the NAND log region 403 at each time. The illustrated plurality of pages of the NAND log region 403 are referred to as pages PG1 to PG12 sequentially from the left. Furthermore, the illustrated "DAT" indicates system data. The illustrated "A_SIG" indicates an active signature A_SIG. The illustrated "S_SIG" indicates a standby signature S_SIG. The illustrated "PRT" indicates parity used for the inter-page ECC. In a case where data is being written in a page PA, an arrow symbol is added to the block.

At time T101, page PG1 stores system data DAT and an active signature A_SIG of an active log AL. At time T101, page PG2 stores system data DAT of an active log AL. At time T101, page PG3 stores parity PRT generated based on the data stored in pages PG1 and PG2. At time T101, page PG4 stores system data DAT of an operation log OL. Page PG5 stores system data DAT of an operation log OL. At time T101, page PG6 stores parity PRT generated at the time of performing a write operation of the operation log OL. At time T101, each of pages PG7 to PG12 is in an unwritten state.

Time T102 is a timing at which the write operation of the standby log SL in the log recording operation (S24) is started. For example, at time T102, the memory controller 3 executes write operations with respect to pages PG7 to PG9. Write data with respect to page PG7 at time T101 includes system data DAT of a standby log SL. Write data with respect to page PG8 at time T101 includes system data DAT and a standby signature S_SIG of a standby log SL. Write data with respect to page PG9 at time T101 includes parity PRT generated based on the data stored in pages PG7 and PG8.

Time T103 is a timing at which the write operations with respect to pages PG7 to PG9 are completed. At time T103, the write operations started from time T102 (S24) are completed.

(Write Operation of Standby Log SL in Power-Off Sequence)

Figure 13:
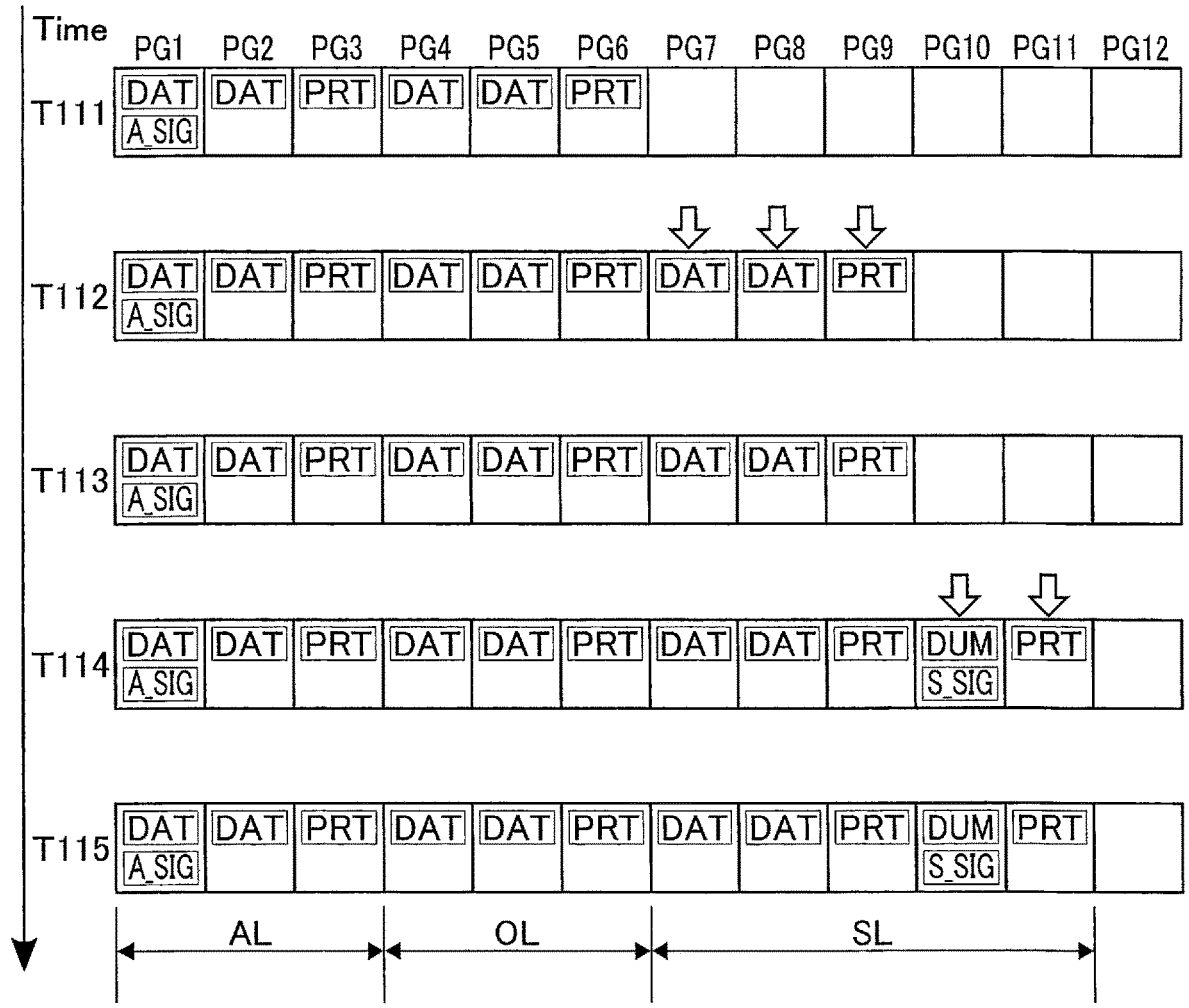
FIG. 13 is a block diagram showing an example of data stored by a write operation of a standby log in the power-off sequence of the memory system according to the first embodiment.

FIG. 13 is a block diagram showing an example of data stored by a write operation of a standby log SL in the power-off sequence of the memory system 1 according to the first embodiment. Each of T111 to T115 aligned along a time axis indicates a certain time. A plurality of blocks aligned to the right of each time indicate a plurality of pages of the NAND log region 403 at each time. The illustrated plurality of pages of the NAND log region 403 are referred to as pages PG1 to PG12 sequentially from the left. Furthermore, the illustrated "DAT" indicates system data. The illustrated "DUM" indicates dummy data. The illustrated "A_SIG" indicates an active signature A_SIG. The illustrated "S_SIG" indicates a standby signature S_SIG. The illustrated "PRT" indicates parity used for the inter-page ECC. In a case where data is written in a page PA, an arrow symbol is added to the block.

At time T111, page PG1 stores system data DAT and an active signature A_SIG of an active log AL. At time T111, page PG2 stores system data DAT of an active log AL. At time T111, page PG3 stores parity PRT generated based on the data stored in page PG1 and page PG2. At time T111, page PG4 stores system data DAT of an operation log OL. At time T111, page PG5 stores system data DAT of an operation log OL. Page PG6 stores parity PRT generated based on the data stored in page PG4 and page PG5. At time T111, each of pages PG7 to PG12 is in an unwritten state.

Time T112 is a timing at which the write operation of the system data DAT of the standby log SL in the power-off sequence (S33) is started. For example, at time T112, the memory controller 3 executes a write operation of the system data DAT of the standby log SL with respect to pages PG7 to PG9. Write data with respect to pages PG7 and PG8 at time T112 includes system data DAT of a standby log SL. Write data with respect to page PG9 at time T112 includes parity PRT generated based on the write data with respect to pages PG7 and PG8.

Time T113 is a timing at which the write operation of the system data DAT of the standby log SL in the power-off sequence (S33) is completed. At time T113, the write operations started from time T112 are completed.

Time T114 is a timing at which the write operation of the standby signature S_SIG in the power-off sequence (S34) is started. For example, at time T114, the memory controller 3 executes write operations with respect to pages PG10 and PG11. Write data with respect to page PG10 at time T114 includes a standby signature S_SIG and dummy data DUM, and does not include system data DAT of a standby log SL. Write data with respect to page PG10 at time T114 includes parity PRT generated based on the write data with respect to page PG9.

Time T115 is a timing at which the write operations with respect to pages PG10 and PG11 are completed. At time T115, the write operations started from time T114 (S34) are completed.

After time T115, the memory system 1 is shut down.

Subsequently, an operation will be described of a case in which abnormal power interruption has occurred during the power-off sequence of the memory system 1 according to the first embodiment.

Figure 14:
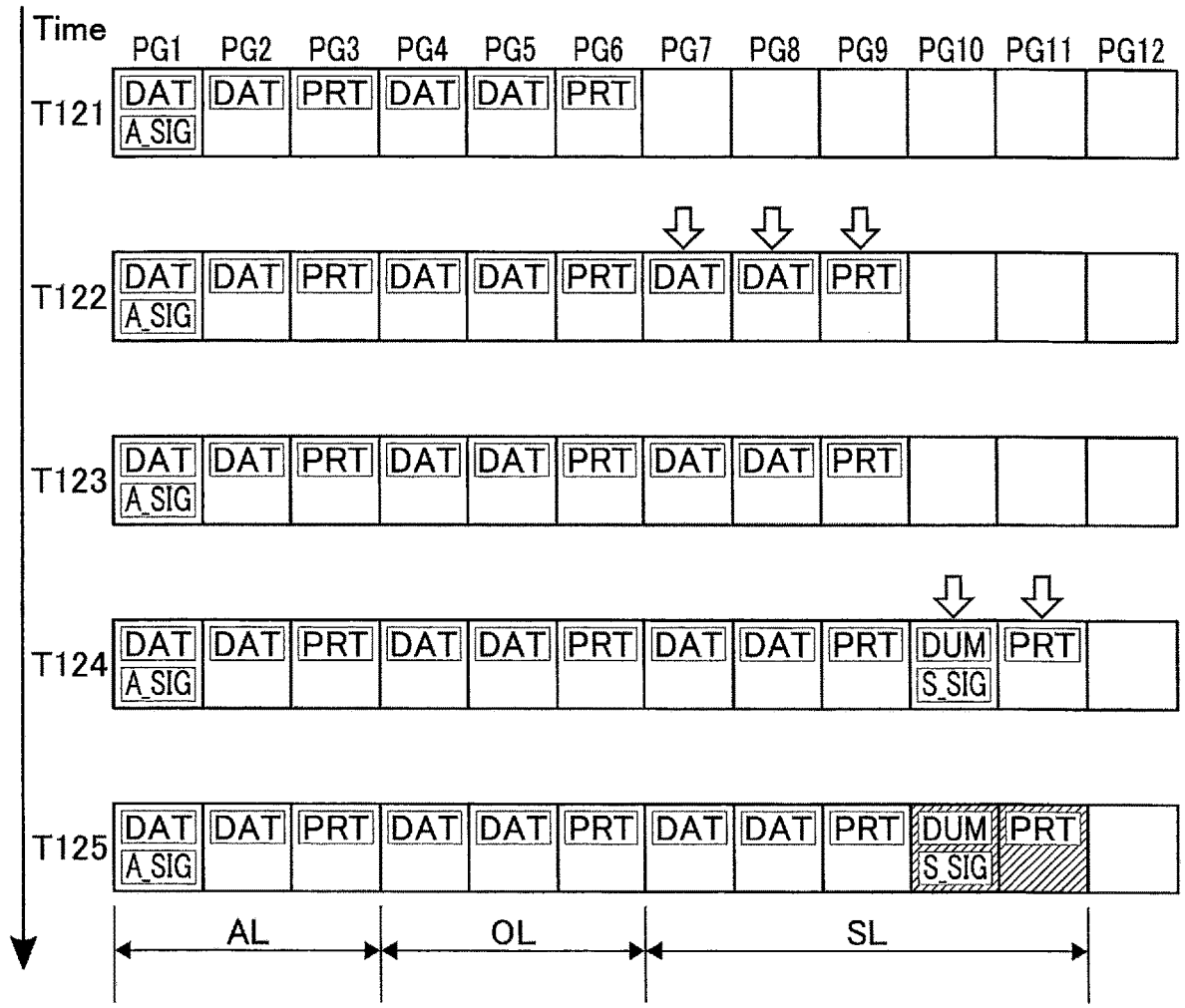
FIG. 14 is a block diagram showing an example of data stored by the write operation of the standby log in the power-off sequence of the memory system according to the first embodiment.

FIG. 14 is a block diagram showing an example of data stored by a write operation of a standby log SL in the power-off sequence of the memory system 1 according to the first embodiment. Each of T121 to T125 aligned along a time axis indicates a certain time. A plurality of blocks aligned to the right of each time indicate a plurality of pages of the NAND log region 403 at each time. The illustrated plurality of pages of the NAND log region 403 are referred to as pages PG1 to PG12 sequentially from the left. Furthermore, the illustrated "DAT" indicates system data. The illustrated "DUM" indicates dummy data. The illustrated "A_SIG" indicates an active signature A_SIG. The illustrated "S_SIG" indicates a standby signature S_SIG. The illustrated "PRT" indicates parity used for the inter-page ECC. In a case where data is written in a page PA, an arrow symbol is added to the block. Oblique lines illustrated in the blocks indicate that the reliability of data written in the page corresponding to the block has deteriorated.

At time T121, page PG1 stores system data DAT and an active signature A_SIG of an active log AL. At time T121, page PG2 stores system data DAT of an active log AL. At time T121, page PG3 stores parity PRT generated based on the data stored in page PG1 and page PG2. At time T121, page PG4 stores system data DAT of an operation log OL. At time T121, page PG5 stores system data DAT of an operation log OL. Page PG6 stores parity PRT generated based on the data stored in page PG4 and page PG5. At time T121, each of pages PG7 to PG12 is in an unwritten state.

Time T122 is a timing at which the write operation of the system data DAT of the standby log SL in the power-off sequence (S33) is started. For example, at time T122, the memory controller 3 executes write operations with respect to pages PG7 to PG9. Write data with respect to pages PG7 and PG8 at time T122 includes system data DAT of a standby log SL. Write data with respect to page PG9 at time T122 includes parity PRT generated based on the write data with respect to pages PG7 and PG8.

Time T123 is a timing at which the write operations with respect to pages PG7 to PG9 are completed. At time T123, the write operations started from time T122 (S33) are completed.

Time T124 is a timing at which the write operation of the standby signature S_SIG in the power-off sequence (S34) is started. For example, at time T124, the memory controller 3 executes write operations with respect to pages PG10 and PG11. Write data with respect to page PG10 at time T124 includes a standby signature S_SIG and dummy data DUM. Write data with respect to page PG11 at time T124 includes parity PRT generated based on the write data with respect to page PG10.

Time T125 is a timing at which the write operation started at time T124 is suspended by, for example, an abnormal power interruption. In accordance with the timing at which the write operation is suspended, pages PG10 and PG11 may be in an unwritten state or a state in which reliability of the write data is deteriorated. In other words, when an abnormal power interruption occurs during the power-off sequence of the memory system 1, the last standby signature S_SIG of the log set LS written therein may not be read, or may be in a state where the reliability is deteriorated. Furthermore, a page PA in which the reliability thereof has deteriorated by an abnormal power interruption is in a condition where error bits tend to increase with the passage of time. If such a page PA exists, the correction ability of the inter-page ECC may deteriorate with the passage of time, thereby causing difficulties to perform error corrections on the system data.

[1-3] Effects of First Embodiment

When performing a power-off sequence, the memory system 1 according to the first embodiment writes the system data and the standby signature S_SIG of the standby log SL at different timings. Furthermore, the memory system 1 writes invalid data (dummy data DUM) in a free space of the page PA in which the standby signature S_SIG is to be written.

This allows the reliability of the system data of the standby log SL to be maintained even if an abnormal power interruption occurs during the power-off sequence, and the last standby signature S_SIG of the log set LS written therein is difficult to be read. Therefore, the memory system 1 according to the first embodiment is able to suppress a risk of losing the system data in the event of an abnormal power interruption during the power-off sequence.

Furthermore, in a case where the last standby signature S_SIG of the log set LS written therein cannot be read, the memory system 1 according to the first embodiment executes a refresh operation of the log set LS stored in the NAND log region 403. By executing the refresh operation, the memory system 1 can re-store the log set LS assumed to have deteriorated reliability in the NAND log region 403 in a state of high reliability. As a result, the memory system 1 according to the first embodiment can maintain the reliability of the log set LS stored in the NAND log region 403.

Furthermore, in the memory system 1 according to the first embodiment, in the write operation of the standby signature S_SIG, the number of pages for which the write operation is executed is suppressed to two pages, which are, for example, the page including the standby signature S_SIG and the dummy data DUM, and the page including the parity of the inter-page ECC. That is, even in a case where the number of error bits of the page on which the standby signature S_SIG is written increases with the passage of time, the number of pages in which the reliability deteriorates may be suppressed to two pages.

Therefore, the memory system 1 according to the first embodiment is able to suppress the number of pages in which reliability may deteriorate in the write operation of the standby signature S_SIG. As a result, the memory controller 3 is able to suppress the number of error bits included in a plurality of pages on which the inter-page ECC processing is to be performed, and suppress deterioration of the error correction ability of the inter-page ECC processing. Therefore, the memory system 1 according to the first embodiment is able to suppress a risk of system data loss.

[2] Second Embodiment

A memory system 1 according a second embodiment has a hardware configuration similar to that of the memory system 1 according to the first embodiment. The second embodiment relates to a write operation of an active log AL.

[2-1] Write Operation of Active Log AL

Figure 15:
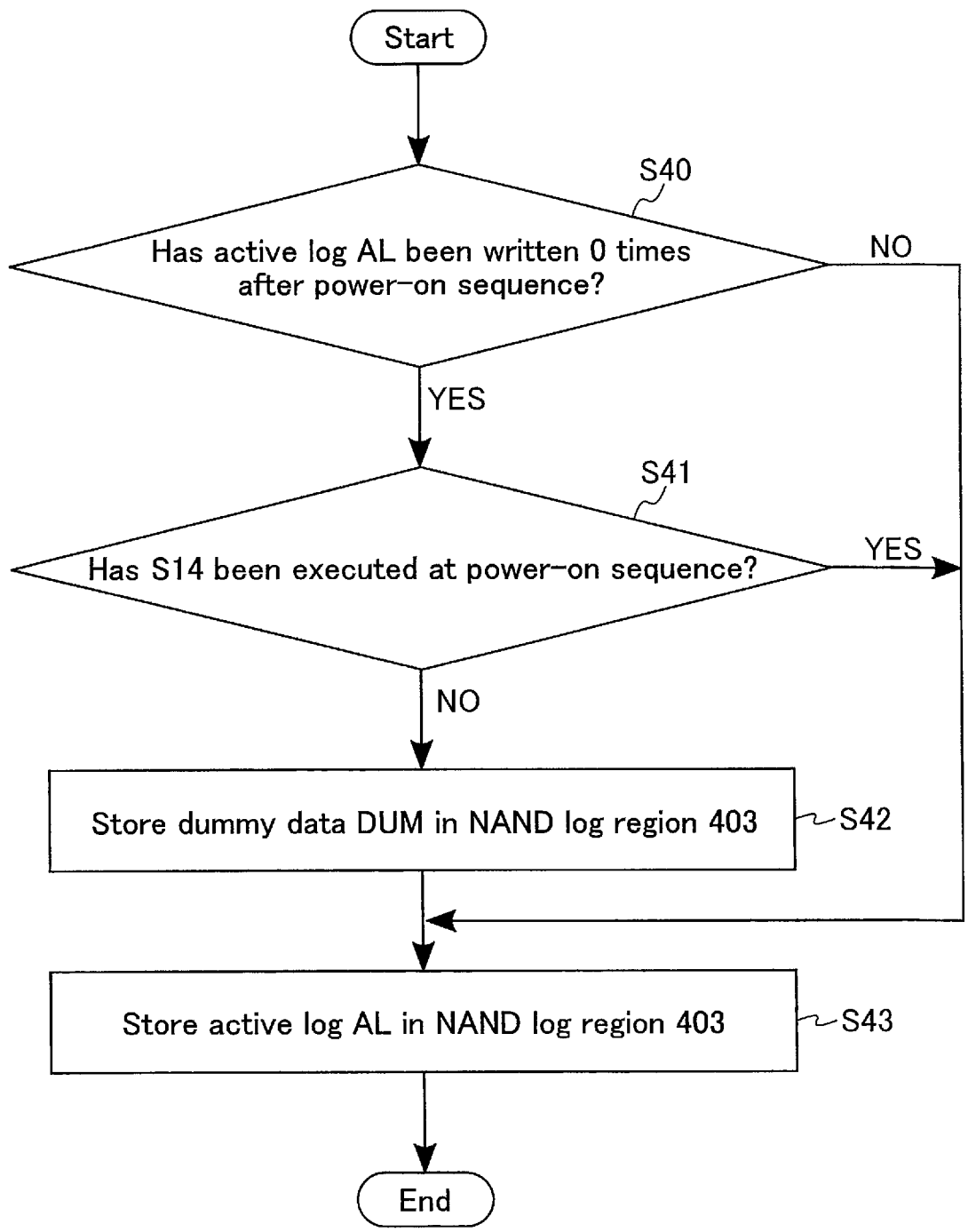
FIG. 15 is a flowchart showing an example of a write operation of an active log in a memory system according to a second embodiment.

FIG. 15 is a flowchart showing an example of the write operation of the active log AL in the memory system 1 according to the second embodiment.

When a memory controller 3 receives a command indicative of access to a nonvolatile memory 4 in S20 shown in FIG. 10 (Start), it is confirmed whether or not the number of times an active log AL has been written after a power-on sequence is zero (S40). It should be noted that the number of times the active log AL has been written may be rephrased as the number of times a log set LS has been written.

In a case where the number of times the active log AL has been written after the power-on sequence is zero (S40, YES), the memory controller 3 confirms whether or not S14 has been executed in the power-on sequence shown in FIG. 9 (S41).

In a case where S14 is not executed in the power-on sequence (S41, NO), the memory controller 3 generates dummy data DUM, and stores the generated dummy data DUM in a NAND log region 403 (S42).

The memory controller 3 then generates an active log AL, and stores the generated active log AL in the NAND log region 403 (S43). The memory controller 3 subsequently ends a series of processing in FIG. 15, and proceeds to S22 shown in FIG. 10.

In a case where the number of times the active log AL has been written after the power-on sequence is not zero (S40, NO), the memory controller 3 generates an active log AL, and stores the generated active log AL in the NAND log region 403 (S43). The memory controller 3 subsequently ends a series of processing in FIG. 15, and proceeds to S22 shown in FIG. 10.

In a case where S14 is executed in the power-on sequence (S41, YES), the memory controller 3 generates an active log AL, and stores the generated active log AL in the NAND log region 403 (S43). The memory controller 3 subsequently ends a series of processing in FIG. 15, and proceeds to S22 shown in FIG. 10.

(Second and Subsequent Write Operations of Active Log AL)

FIG. 16 is a block diagram showing an example of data stored by second and subsequent write operations of the active log AL in the memory system 1 according to the second embodiment. The second and subsequent write operations of the active log AL are second and subsequent write operations of the active log AL after the power-on sequence. Each of T201 to T203 aligned along a time axis indicates a certain time. A plurality of blocks aligned to the right of each time indicate a plurality of pages of the NAND log region 403 at each time. The illustrated plurality of pages of the NAND log region 403 are referred to as pages PG1 to PG12 sequentially from the left. Furthermore, the illustrated "DAT" indicates system data. The illustrated "A_SIG" indicates an active signature A_SIG. The illustrated "S_SIG" indicates a standby signature S_SIG. The illustrated "PRT" indicates parity used for an inter-page ECC. An arrow directed towards the block indicates a case where data is being written in page PA.

At time T201, page PG1 stores system data DAT and a standby signature S_SIG of a standby log SL. At time T201, page PG2 stores system data DAT of a standby log SL. At time T201, page PG3 stores parity PRT generated based on the data stored in pages PG1 and PG2. At time T201, each of pages PG4 to PG12 is in an unwritten state.

Time T202 is a timing at which second and subsequent write operations of an active log AL (S43) are started after a log recording operation is started. For example, at time T202, the memory controller 3 executes write operations with respect to pages PG4 to PG6. Write data with respect to page PG4 at time T202 includes system data DAT and an active signature A_SIG of an active log AL. Write data with respect to page PG5 at time T202 includes system data DAT of an active log AL. Write data with respect to page PG6 at time T202 includes parity PRT generated based on the write data with respect to pages PG4 and PG5.

Time T203 is a timing at which the write operations with respect to pages PG4 to PG6 are completed. At time T203, the write operations started from time T202 (S43) are completed.

(Initial Write Operation of Active Log AL)

Figure 17:
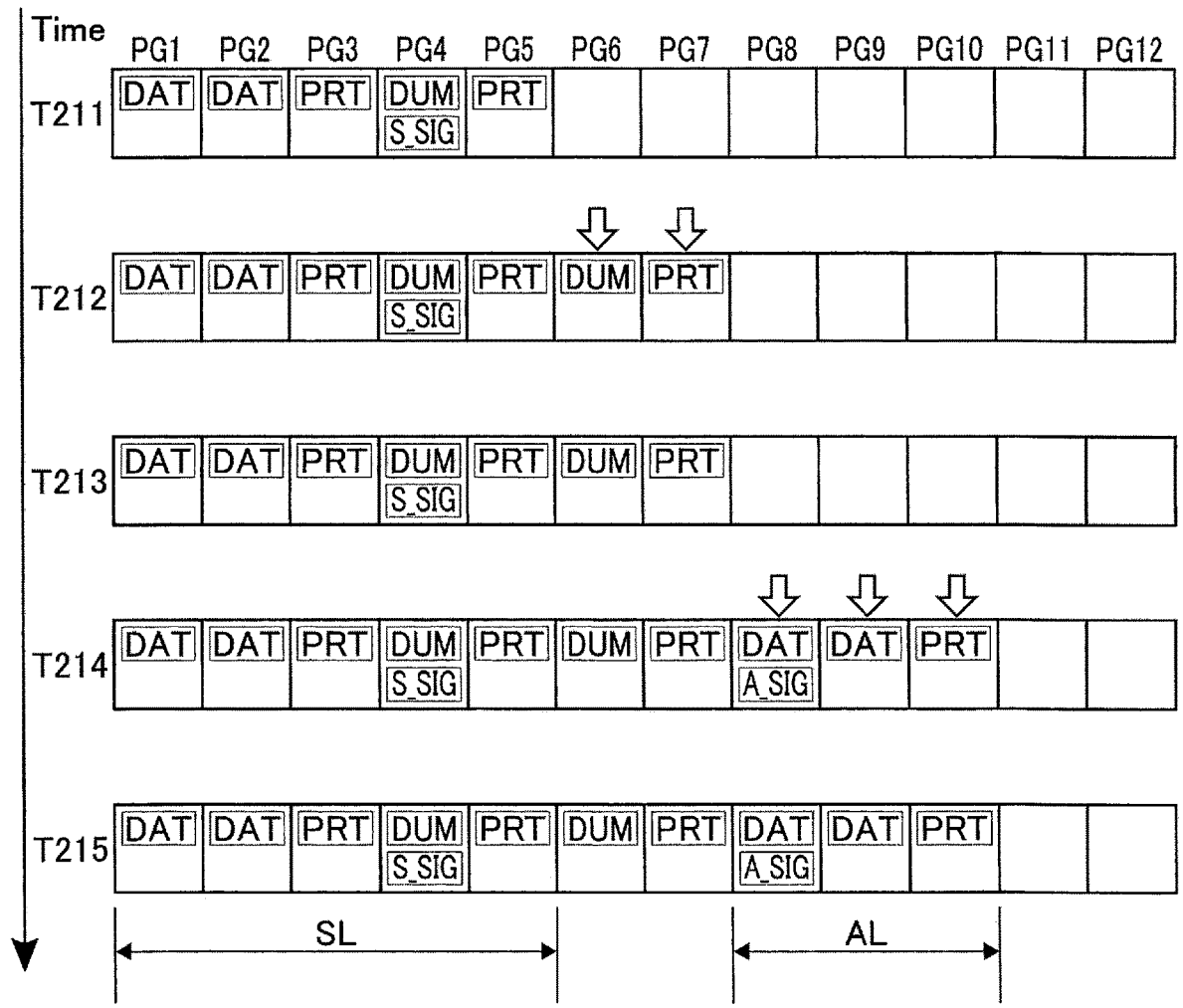
FIG. 17 is a block diagram showing an example of data stored by an initial write operation of the active log in the memory system according to the second embodiment.

FIG. 17 is a block diagram showing an example of data stored by an initial write operation of the active log AL in the memory system 1 according to the second embodiment. The initial write operation of the active log AL is an initial write operation of the active log AL after the power-on sequence. Each of T211 to T215 aligned along a time axis indicates a certain time. A plurality of blocks aligned to the right of each time indicate a plurality of pages of the NAND log region 403 at each time. The illustrated plurality of pages of the NAND log region 403 are referred to as pages PG1 to PG12 sequentially from the left. Furthermore, the illustrated "DAT" indicates system data. The illustrated "DUM" indicates dummy data. The illustrated "A_SIG" indicates an active signature A_SIG. The illustrated "S_SIG" indicates a standby signature S_SIG. The illustrated "PRT" indicates parity used for an inter-page ECC. In a case where data is being written in a page PA, an arrow symbol is added to the block.

At time T211, page PG1 stores system data DAT of a standby log SL. At time T211, page PG2 stores system data DAT of a standby log SL. At time T211, page PG3 stores parity PRT generated based on the data stored in pages PG1 and PG2. At time T211, page PG4 stores dummy data DUM and a standby signature S_SIG. At time T211, page PG5 stores parity PRT generated based on the data stored in page PG4. At time T211, each of pages PG6 to PG12 is in an unwritten state.

Time T212 is a timing at which the write operation of the dummy data (DUM) (S42) is started prior to the initial write operation of the active log AL. For example, at time T212, the memory controller 3 executes write operations with respect to pages PG6 and PG7. Write data with respect to page PG6 at time T212 includes dummy data DUM, and does not include an active signature A_SIG. Write data with respect to page PG7 at time T212 includes parity PRT generated based on the write data with respect to page PG6.

Time T213 is a timing at which the write operations with respect to pages PG6 and PG7 are completed. At time T213, the write operations started from time T212 (S42) are completed.

Time T214 is a timing at which the initial write operation of the active log AL (S43) is started. For example, at time T214, the memory controller 3 executes write operations with respect to pages PG8 to PG10. Write data with respect to page PG8 at time T214 includes an active signature A_SIG and system data DAT of an active log AL. Write data with respect to page PG9 at time T214 includes system data DAT of an active log AL. Write data with respect to page PG10 at time T214 includes parity PRT generated based on the write data with respect to pages PG8 and PG9.

Time T215 is a timing at which the write operations with respect to pages PG8 to PG10 are completed. At time T215, the write operations started from time T214 (S43) are completed.

Subsequently, an operation will be described of a case in which abnormal power interruption has occurred during a write operation of an active log AL in a memory system 1 according to a second embodiment.

Figure 18:
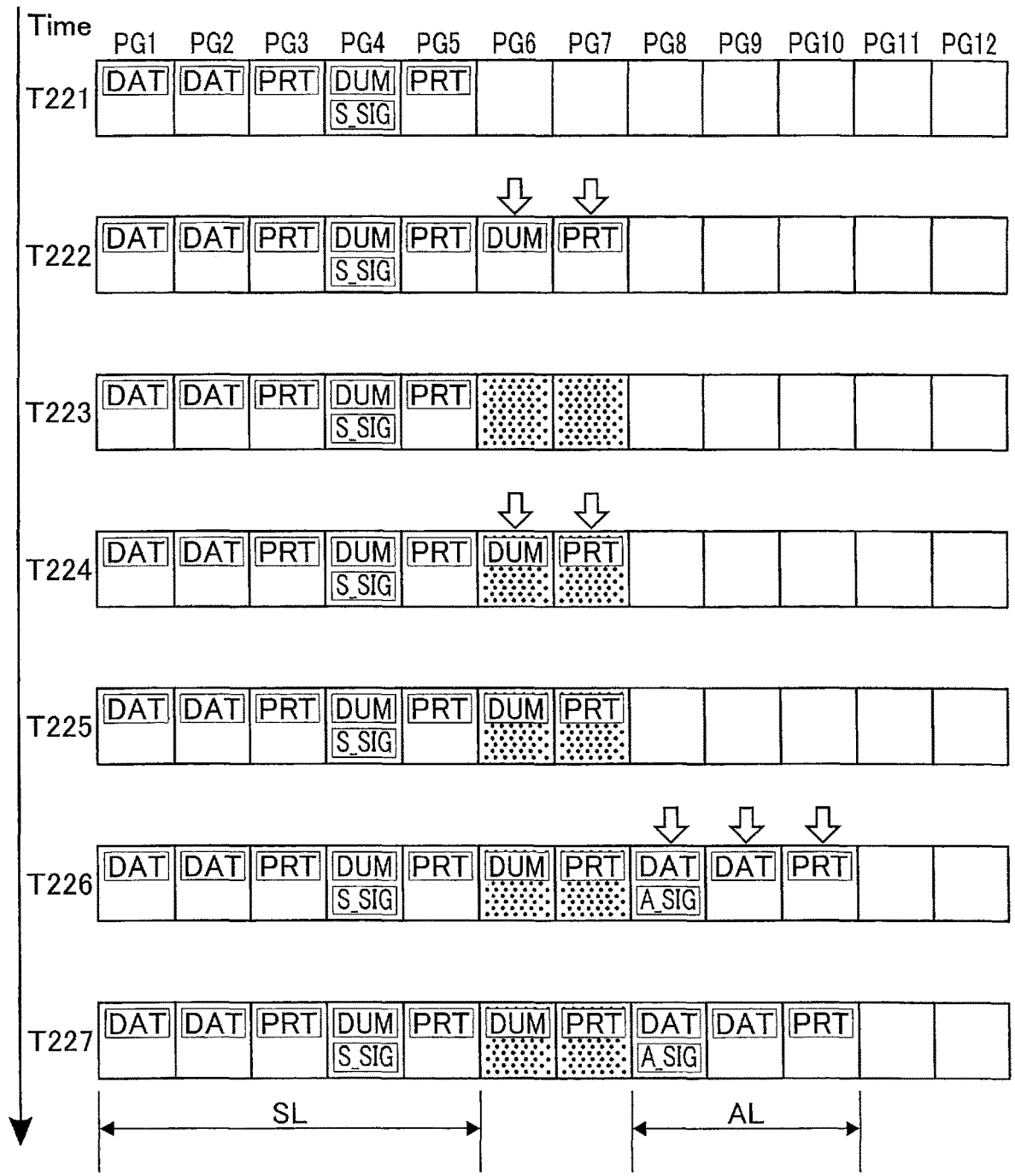
FIG. 18 is a block diagram showing an example of data stored by the initial write operation of the active log in the memory system according to the second embodiment.

FIG. 18 is a block diagram showing an example of data stored by an initial write operation of the active log AL in the memory system 1 according to the second embodiment. Each of T221 to T227 aligned along a time axis indicates a certain time. A plurality of blocks aligned to the right of each time indicate a plurality of pages of the NAND log region 403 at each time. The illustrated plurality of pages of the NAND log region 403 are referred to as pages PG1 to PG12 sequentially from the left. Furthermore, the illustrated "DAT" indicates system data. The illustrated "DUM" indicates dummy data. The illustrated "A_SIG" indicates an active signature A_SIG. The illustrated "S_SIG" indicates a standby signature S_SIG. The illustrated "PRT" indicates parity used for an inter-page ECC. An arrow directed towards the block indicates a case where data is being written in page PA. A dotted pattern illustrated in the block indicates that a write operation executed on a page corresponding thereto has been suspended, and that the page is determined as being in an unwritten state after the suspension.

Time T221 is a timing after completing the power-on sequence and prior to starting the initial log recording operation. At time T221, page PG1 stores system data DAT of a standby log SL. At time T221, page PG2 stores system data DAT of a standby log SL. At time T221, page PG3 stores parity PRT generated based on the data stored in pages PG1 and PG2. At time T221, page PG4 stores dummy data DUM and a standby signature S_SIG. At time T221, page PG5 stores parity PRT generated based on the data stored in page PG4. At time T221, each of pages PG6 to PG12 is in an unwritten state.

Time T222 is a timing at which the write operation of the dummy data (DUM) (S42) is started prior to the initial write operation of the active log AL. For example, at time T222, the memory controller 3 executes write operations with respect to pages PG6 and PG7. Write data with respect to page PG6 at time T222 includes dummy data DUM. Write data with respect to page PG7 at time T222 includes parity PRT generated based on the write data with respect to page PG6.

Time T223 is a timing at which the write operations started at time T222 are ended abnormally. At the point of time T223, threshold voltages of memory cells of pages PG6 and PG7 are in a state where they have increased in accordance with the write data and the timing at which the write operation has ended. However, here, since the memory controller 3 fails to recognize that a write operation has been executed for pages PG6 and PG7, the memory controller 3 recognizes that pages PG6 and PG7 are in an unwritten state.

Time T224 is a timing at which an initial write operation of the active log AL is started after time T223. In the initial write operation of the active log AL, prior to writing an active log AL in the NAND log region 403, the memory controller 3 writes dummy data DUM in the NAND log region 403. Here, since the memory controller 3 recognizes pages PG6 and PG7 as being in an unwritten state, the memory controller 3 starts the write operation of the dummy data DUM (S42) with respect to pages PG6 and PG7 on which the write operation has been executed at time T222. The write data with respect to pages PG6 and PG7 at time T224 may be the same as that of, for example, time T222, or may be different therefrom. For example, the write data with respect to page PG6 at time T224 includes dummy data DUM that is the same as the write data with respect to page PG6 at time T222. The write data with respect to page PG7 at time T224 includes parity PRT generated based on the write data with respect to page PG6 at time T224.

Time T225 is a timing at which the write operations with respect to pages PG6 and PG7 are completed. At time T225, the write operations started from time T224 (S42) are completed. At the point of time T225, write operations are executed for pages PG6 and PG7 a number of times. That is, the write operations are executed by the memory controller 3 in a state where the threshold voltage of a part of the memory cell of the selected page PG has increased. Therefore, at the point of time T225, the data written in pages PG6 and PG7 may not be written correctly. Furthermore, if such a page PA exists, the correction ability of the inter-page ECC may deteriorate, causing difficulty in performing error corrections on the system data.

Time T226 is a timing at which the initial write operation of the active log AL (S43) is started. For example, at time T226, the memory controller 3 executes write operations of an active log AL with respect to pages PG8 to PG10. Write data with respect to page PG8 at time T226 includes an active signature A_SIG and system data DAT of an active log AL. Write data with respect to page PG9 at time T226 includes system data DAT of an active log AL. Write data with respect to page PG10 at time T226 includes parity PRT generated based on the write data with respect to pages PG8 and PG9.

Time T227 is a timing at which the write operations with respect to pages PG8 to PG10 are completed. At time T227, the write operations started from time T226 (S43) are completed.

[2-2] Advantageous Effects of Second Embodiment

The memory system 1 according to the second embodiment selects a page for starting a write operation with respect to the NAND log region 403 based on the result of reading the NAND log region 403 in the power-on sequence. However, the page on which an initial write operation is to be executed in the NAND log region 403 may be a page that is recognized as being unwritten since a write operation has been executed under abnormal power interruption. When a write operation is executed for such a page, data may not be written correctly, which may cause the data of the page to be lost or the reliability thereof to deteriorate.

Therefore, the memory system 1 according to the second embodiment executes a write operation of dummy data DUM prior to writing an initial active log AL after the power-on sequence. In this manner, the dummy data DUM is written in a page which may be recognized as being unwritten due to the write operation being executed under a circumstance of abnormal power interruption. The memory system 1 executes the write operation of the active log AL after the dummy data DUM is stored in the NAND log region 403.

As a result, the memory system according to the second embodiment is able to execute the write operation of the active log AL with respect to an unwritten page on which a write operation has not been executed. That is, the memory system 1 may prevent the active log AL from being written in a page whose reliability may have deteriorated. As a result, the memory system 1 according to the second embodiment is able to suppress the reliability of the written active log AL from deteriorating, and the risk of system data loss.

It should be noted that, in a case where the memory controller 3 executes the write operation of the active log AL without writing the dummy data DUM in the initial write operation of the active log AL, reliability of three or more pages may deteriorate. In contrast, when the write operation of the dummy data DUM is performed, the memory system 1 according to the second embodiment suppresses the number of pages for executing a write operation to, for example, two pages, which are a page including the dummy data DUM and a page including parity of the inter-page ECC. That is, in the initial write operation of the active log AL, the pages of which reliability may deteriorate are suppressed to two pages.

In this manner, the memory system 1 according to the second embodiment can suppress the number of pages of which reliability may deteriorate in the initial write operation of the active log AL. As a result, the memory controller 3 can suppress the number of error bits included in a plurality of pages on which the inter-page ECC processing is to be performed, thereby suppressing deterioration of the error correction ability of the inter-page ECC processing. Therefore, the memory system 1 according to the second embodiment is capable of suppressing a risk of system data loss.

[3] Third Embodiment

A memory system 1 according a third embodiment has a hardware configuration similar to that of the memory system 1 according to the first embodiment. The third embodiment relates to a write operation of a page whose reliability may be deteriorated.

[3-1] Error Correction Method of Data Stored in NAND Log Region 403

FIG. 19 is a flowchart showing an example of an error correction method for a read operation with respect to a NAND log region 403 of the memory system 1 according to the third embodiment. The memory system 1 changes an error correction ability in accordance with the type of data read in the read operation with respect to the NAND log region 403. It should be noted that the "error correction ability" corresponds to, for example, the number of bits capable of correcting errors in inner-page ECC processing. Whether the error correction ability is high or low corresponds to the magnitude of the number of bits capable of correcting errors.

When data is read from the NAND log region 403 of a nonvolatile memory 4 (Start), a memory controller 3 confirms whether or not the read page includes dummy data DUM (S50).

In a case where the read page includes dummy data DUM (S50, YES), the memory controller 3 controls an ECC circuit 35 to execute inner-page ECC processing by a first error correction ability (S51).

When S51 is completed, the memory controller 3 confirms whether or not the error correction performed by the inner-page ECC processing has succeeded (S53). That is, the memory controller 3 confirms whether or not the error correction of the read page has succeeded by using the first error correction ability.

In a case where the read page does not include dummy data DUM (S50, NO), the memory controller 3 controls the ECC circuit 35 to execute inner-page ECC processing by a second error correction ability, which is higher than the first error correction ability (S52). That is, the ECC circuit 35 uses an error correction ability that is lower than that used for data read from a page in which system data DAT is written to execute error correction processing on data read from a page in which dummy data DUM is written.

When S52 is completed, the memory controller 3 confirms whether or not the error correction performed by the inner-page ECC processing has succeeded (S53). That is, the memory controller 3 uses the second error correction ability to confirm whether or not the error correction of the read page has succeeded.

In a case where the error correction by the inner-page ECC processing has succeeded (S53, YES), the memory controller 3 ends a series of processing in FIG. 19 (End).

In a case where the error correction by the inner-page ECC processing has not succeeded (S53, NO), the memory controller 3 executes a refresh operation of the read page (S54). The timing at which the refresh operation of S54 is executed may be at other timings as well. The memory controller 3 subsequently ends the series of processing in FIG. 19 (End).

It should be noted that the memory controller 3 may execute a reserved refresh operation at any timing. For example, the memory controller 3 may execute the refresh operation after the read operation of the NAND log region 403 is executed, or while the read operation of the NAND log region 403 is executed.

Furthermore, other conditions may be set as a condition of S53. For example, the memory controller 3 may determine whether or not to reserve the refresh operation based on the number of error bits detected in the inner-page ECC processing. In this case, the memory controller 3 determines whether or not the number of error bits detected by the inner-page ECC processing exceeds a predetermined threshold in S53. As the predetermined threshold, it is preferable to set a threshold set for the read data of the dummy data DUM lower than a threshold set for the read data of the system data DAT. Furthermore, as the condition of S53, presence/absence of a retry read may also be used. In this case, when the retry read is required, the memory controller 3 reserves a refresh operation of a block BLK for which the retry read is required.

Figure 20:
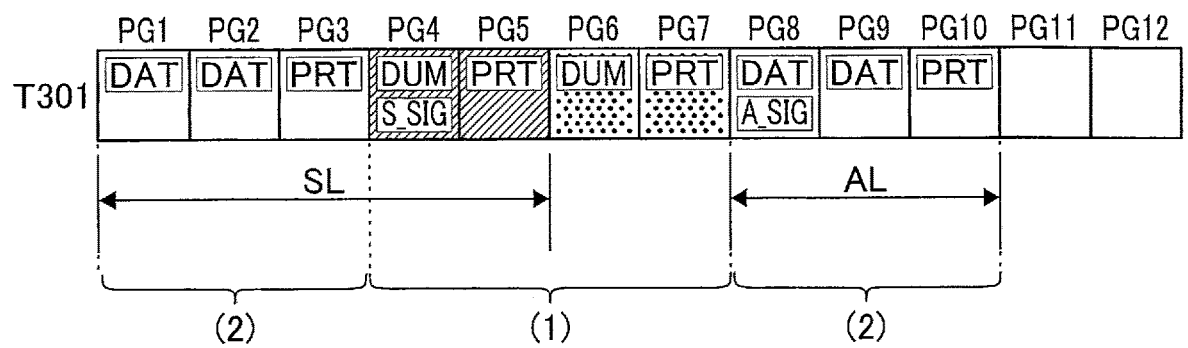
FIG. 20 is a block diagram showing an example of a storage region including a standby log and an active log in the memory system according to the third embodiment.

FIG. 20 is a block diagram showing an example of a storage region including a standby log SL and an active log AL in the memory system 1 according to the third embodiment. T301 indicates a certain time. A plurality of blocks aligned to the right of time T301 indicate a plurality of pages of the NAND log region 403 at that time. The illustrated plurality of pages of the NAND log region 403 are referred to as pages PG1 to PG12 sequentially from the left. Furthermore, the illustrated "DAT" indicates system data. The illustrated "DUM" indicates dummy data. The illustrated "A_SIG" indicates an active signature A_SIG. The illustrated "S_SIG" indicates a standby signature S_SIG. The illustrated "PRT" indicates parity used for an inter-page ECC. Oblique lines illustrated in the blocks indicate that the reliability of data written in the page corresponding to the block has deteriorated. A dotted pattern illustrated in the block indicates that a write operation executed on a page corresponding thereto has been suspended, and that the page is determined as being in an unwritten state after the suspension.

At time T301, page PG1 includes system data DAT of a standby log SL. At time T301, page PG2 includes system data DAT of a standby log SL. At time T301, page PG3 includes parity PRT generated based on the data stored in pages PG1 and PG2. At time T301, page PG4 includes dummy data DUM and a standby signature S_SIG. At time T301, page PG5 includes parity PRT generated based on the data stored in page PG4. It should be noted that, at time T301, due to the suspension of the write operation of the active signature S_SIG, pages PG4 and PG5 are in a state where reliability is deteriorated. At time T301, page PG6 includes dummy data DUM. At time T301, page PG7 includes parity PRT generated based on the data stored in page PG6. It should be noted that the data written in pages PG6 and PG7 is written with respect to a page that has been determined as being in an unwritten state after the write operation has been interrupted. At time T301, page PG8 includes system data DAT and an active signature A_SIG of an active log AL. At time T301, page PG9 includes system data DAT of an active log AL. Page PG10 includes parity PRT generated based on the data stored in pages PG8 and PG9. At time T301, each of pages PG11 and PG12 is in an unwritten state.

Figure 21:
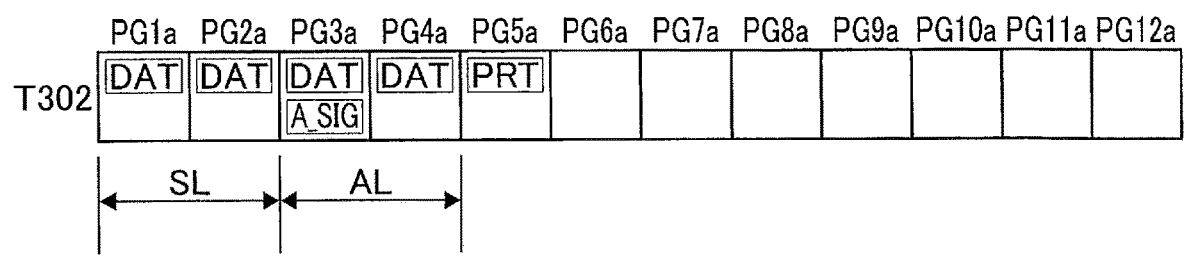
FIG. 21 is a block diagram showing another example of a storage region including a standby log and an active log after a refresh operation in the memory system according to the third embodiment.

FIG. 21 is a block diagram showing another example of a storage region including a standby log SL and an active log AL after a refresh operation in the memory system 1 according to the third embodiment. T302 indicates a time after time T301. A plurality of blocks aligned to the right of time T302 indicate a plurality of pages of the NAND log region 403 at that time. The illustrated plurality of pages of the NAND log region 403 are referred to as pages PG1a to PG12a sequentially from the left. Furthermore, the illustrated "DAT" indicates system data. The illustrated "A_SIG" indicates an active signature A_SIG. The illustrated "PRT" indicates parity used for an inter-page ECC.

At time T302, page PG1a includes the data stored in page PG1 at time T301, that is, system data DAT of a standby log SL. At time T302, page PG2a includes the data stored in page PG2 at time T301, that is, system data DAT of a standby log SL. At time T302, page PG3a includes the data stored in page PG8 at time T301, that is, system data DAT and an active signature A_SIG of an active log AL. At time T302, page PG4a includes the data stored in page PG9 at time T301, that is, system data DAT of an active log AL. At time T302, page PG5a includes parity PRT generated based on the data stored in pages PG1a, PG2a, PG3a, and PG4a. At time T302, each of pages PG6a to PG12a is in an unwritten state.

Therefore, the memory controller 3 may omit writing dummy data DUM in the refresh operation. Furthermore, in the refresh operation, the memory controller 3 also omits writing the standby signature S_SIG stored in page PG4 at time T301. The memory controller 3 may also write the standby signature S_SIG written in page PG4 at time T301 in page PG2a at time T302, that is, in the last page of the standby log SL.

[3-2] Advantageous Effects of Third Embodiment

As described in the first and second embodiments, the reliability of a page in which the dummy data DUM is stored may deteriorate in the case where interruption of a write operation occurs. In the case where the reliability of the page in which the dummy data DUM is stored deteriorates, the data written in the block BLK including the page may also deteriorate.

Therefore, the memory system 1 according to the third embodiment executes error correction processing by an error correction ability lower than that used for the system data DAT with respect to the data read from a page in which the dummy data DUM is stored. In this manner, the memory system 1 according to the third embodiment can detect reliability deterioration of a block BLK including dummy data DUM at an early stage. Therefore, the memory system 1 can execute a refresh operation for the system data DAT of the block BLK whose reliability has deteriorated at an early stage. Therefore, the memory system 1 according to the third embodiment is capable of suppressing a risk of system data loss.

The embodiments are only examples, and therefore do not limit the scope of the invention.

What is claimed is:
1. A memory system comprising:
a nonvolatile memory including a first storage region and a second storage region; and
a memory controller configured to control the nonvolatile memory, wherein
the memory controller comprises a third storage region storing a master table and a fourth storage region storing a change history of the master table,
the memory controller is configured to:
order, when receiving a power-off command from outside, the nonvolatile memory to write the master table stored in the third storage region in the first storage region;
order the nonvolatile memory to write the change history stored in the fourth storage region in the second storage region;
generate a first standby log including first system data relating to power-off and a first standby signature indicating that recording of the change history has ended;

order the nonvolatile memory to write the first system data of the first standby log in the second storage region; and order, after the first system data is written in the second storage region, the nonvolatile memory to write the first standby signature of the first standby log in the second storage region.

2. The memory system of claim 1, wherein a page in which the first standby signature is written includes invalid data, and does not include the first system data.

3. The memory system of claim 1, wherein
the memory controller is configured to:
order, when receiving a command indicative of access to the nonvolatile memory from outside, the nonvolatile memory to write an active signature indicating that recording of the change history has started in the second storage region;
order the nonvolatile memory to write the change history stored in the fourth storage region in the second storage region;
generate a second standby log including second system data relating to ending recording of the change history and a second standby signature indicating that recording of the change history has ended; and
order the nonvolatile memory to write the second system data and the second standby signature in the second storage region.

4. The memory system of claim 1, wherein, in error correction processing of read data, the memory controller is configured to set an error correction ability with respect to first read data read from a page in which the first standby signature is stored lower than an error correction ability with respect to second read data read from a page in which the first system data is stored.

5. A memory system comprising:
a nonvolatile memory including a first storage region storing a copy of a master table and a second storage region storing a copy of a change history of the master table; and
a memory controller is configured to control the nonvolatile memory, wherein
the memory controller comprises a third storage region storing the master table and a fourth storage region storing the change history of the master table,
the memory controller is configured to:
when receiving a power-on command from outside, store a copy of the master table stored in the first storage region in the third storage region, and store a copy of the change history of the master table stored in the second storage region in the fourth storage region; and
order, after receiving the power-on command, when receiving a command indicative of access to the nonvolatile memory from outside for the first time, the nonvolatile memory to write invalid data in the second storage region; and
order, after the invalid data is written in the second storage region, the nonvolatile memory to write a first active signature indicating that recording of the change history has started in the second storage region.

6. The memory system of claim 5, wherein a page in which the invalid data is written does not include the first active signature.

7. The memory system of claim 5, wherein
the memory controller is configured to:
order, after the first active signature is written in the second storage region, the nonvolatile memory to write a first standby signature indicating that recording of the change history has ended in the second storage region, and
order, after the first standby signature is written in the second storage region, when receiving a command indicative of access to the nonvolatile memory from outside, the nonvolatile memory to write a second active signature indicating that recording of the change history has started in the second storage region, without storing invalid data.

8. The memory system of claim 5, wherein, in error correction processing of read data, the memory controller is configured to set an error correction ability with respect to first read data read from a page in which the invalid data is stored lower than an error correction ability with respect to second read data read from a page in which the first active signature is stored.

9. A control method of a memory system comprising:
storing, in accordance with receiving a power-off command from outside, a master table in a first storage region of a nonvolatile memory;
storing a change history of the master table in a second storage region of the nonvolatile memory;
generating a first standby log including first system data relating to power-off and a first standby signature indicating that recording of the change history has ended;
storing the first system data of the first standby log in the second storage region; and
storing, after storing the first system data in the second storage region, the first standby signature of the first standby log in the second storage region.

10. A control method of a memory system comprising:
storing, when receiving a power-on command from outside, a copy of a master table stored in a first storage region of a nonvolatile memory and a copy of a change history of the master table stored in a second storage region of the nonvolatile memory in a third storage region and a fourth storage region of a memory controller, respectively;
storing, after receiving the power-on command, invalid data in the second storage region when receiving a command indicative of access to the nonvolatile memory from outside for the first time, and
storing, after the invalid data is written in the second storage region, a first active signature indicating that recording of the change history has started in the second storage region.

* * * * *